United States Patent [19]

Glasbergen et al.

[11] 3,729,678

[45] Apr. 24, 1973

[54] PCM SYSTEM INCLUDING A PULSE PATTERN ANALYZER

[75] Inventors: Johannes Wilhelmus Glasbergen, Hilversum; Johannes Anton Greefkes, Emmasingel, Eindhoven; Frank de Jager, Emmasingel, Eindhoven; Adrianus Wilhelmus Maria van der Enden, Emmasingel, Eindhoven, all of Netherlands

[73] Assignee: U.S. Philips Corporation, New York, N.Y.

[22] Filed: July 20, 1971

[21] Appl. No.: 164,479

Related U.S. Application Data

[63] Continuation of Ser. No. 808,086, March 18, 1969, abandoned.

[52] U.S. Cl. ............................325/38 A, 178/DIG. 3

[51] Int. Cl. .............................................H04b 1/100

[58] Field of Search..........................325/38 A, 38.1; 332/11 D; 178/6, DIG. 3, 68; 179/15 AC, 15, 155

[56] References Cited

UNITED STATES PATENTS 3,555,423 1/1971 Weston ..............................325/38 B

*Primary Examiner*—Robert L. Griffin
*Assistant Examiner*—Barry L. Leibowitz
*Attorney*—Frank R. Trifari

[57] ABSTRACT

A delta pulse code modulation system includes a feedback loop comprising a pulse pattern analyzer for detecting a large instantaneous modulation index within a fixed time interval. The system exhibits a wide range of modulation and suppresses whistling and interference tones at low pulse rates.

62 Claims, 13 Drawing Figures

Figure 1:
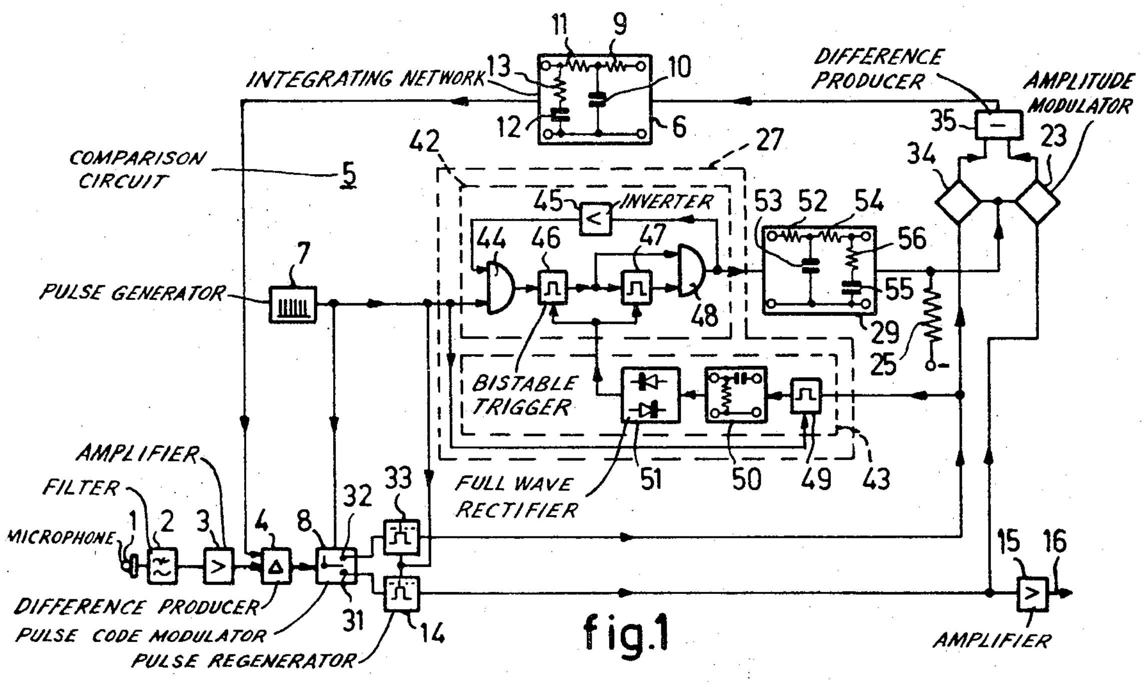

INVENTORS.
JOHANNES W. GLASBERGEN
JOHANNES A. GREEFKES
FRANK DE JAGER
ADRIANUS W. M. VAN DEN ENDEN
BY [signature]
AGENT INVENTORS.
JOHANNES W. GLASBERGEN
JOHANNES A. GREEFKES
FRANK DE JAGER
ADRIANUS W. M. VAN DEN ENDEN
BY
AGENT INVENTORS
JOHANNES W. GLASBERGEN
JOHANNES A. GREEFKES
FRANK DE JAGER
ADRIANUS W. M. VAN DEN ENDEN
BY
AGENT INVENTORS
JOHANNES W. GLASBERGEN
JOHANNES A. GREEFKES
FRANK DE JAGER
ADRIANUS W. M. VAN DEN ENDEN
BY Frank R. Jinfaim
AGENT INVENTORS.
JOHANNES W. GLASBERGEN
JOHANNES A. GREEFKES
FRANK DE JAGER
ADRIANUS W. M. VAN DEN ENDEN
BY
Frank R. Trifari
AGENT Patented April 24, 1973 3,729,678

9 Sheets-Sheet 6

INVENTORS
JOHANNES W. GLASBERGEN
JOHANNES A. GREEFKES
FRANK DE JAGER
ADRIANUS W. M. VAN DEN ENDEN

BY

AGENT

INVENTORS
JOHANNES W. GLASBERGEN
JOHANNES A. GREEFKES
FRANK DE JAGER
ADRIANUS W.M. VAN DEN ENDEN
BY
AGENT

Patented April 24, 1973

3,729,678

9 Sheets-Sheet 8

INVENTORS
JOHANNES W. GLASBERGEN
JOHANNES A. GREEFKES
FRANK DE JAGER
ADRIANUS W. M. VAN DEN ENDEN
BY [signature]
AGENT INVENTORS
JOHANNES W. GLASBERGEN
JOHANNES A. GREEFKES
FRANK DE JAGER
ADRIANUS W. M. VAN DEN ENDEN
BY
AGENT

PCM SYSTEM INCLUDING A PULSE PATTERN ANALYZER

This application is a continuation of application Ser. No. 808,086 filed March 18, 1969 now abandoned. No. 2,662,118.

The invention relates to a device for the transmission of signals by pulse code modulation and transmitters and receivers for use therewith, the transmitter being provided with a pulse code modulator connected to a pulse generator, the output pulses of said pulse code modulator being transmitted to the co-operating receiver and also being applied to a comparison device comprising a local receiver provided with an integrating network for generating a comparison signal which is applied together with the signals to be transmitted, to a difference producer for generating a difference signal which controls the pulse code modulator. Such a form of pulse code modulation is known under the name of delta modulation and has previously been described, for example, in U.S. Pat. No. 2,662,118.

In pulse code modulation in general and hence also with delta modulation, the amplitude quantization gives rise to deviations between the signal reproduced by the receiver and the original signal which deviations produce the so-called quantization noise and influence the quality of transmission in an unfavorable sense. When increasing the pulse frequency, the deviations between the reproduced signal and the original signal decrease and hence the accuracy of reproduction increases so that very high pulse frequencies and hence large bandwidths are required for high-quality signal transmission.

To reduce the pulse frequency, it is known to use a dynamic control in such transmission devices in which two different groups are distinguished. In the first group and instantaneous dynamic control is employed while using non-linear circuits which devices prove to be comparatively simple as regards construction, but on the other hand make possible only a comparatively low degree of compression with the result that the reduction of the quantization noise in such a device only occurs to a limited extent. In the second group of devices which are more complicated in their construction a system of dynamic control is employed formed by a dynamic control device which is controlled by a continuously varying dynamic control voltage from a dynamic control voltage generator and in which also the dynamic control voltage is transmitted to the receiver end so that the degree of compression is accurately known at the receiver end thus permitting a very high degree of compression resulting in an optimum reduction of the quantization noise.

In a known device of the last-mentioned group as has been described in U.S. Pat. No. 3,249,870 the envelope signal in the band of 0–0.1 kHz obtained by rectification together with the signals to be transmitted, for example, in the band of 0.3–3.4 kHz are to this end applied to the pulse code modulator so that the transmitted pulse series has two pieces of information, namely the presence and absence of the pulses characterizes the signals to be transmitted and the average pulse density characterizes the envelope signal so that the dynamic control voltage serving for dynamic control is generated by smoothing the transmitted pulse series. In this manner a very high degree of compression and hence an optimum reduction of the quantization noise can be obtained; it was found, for example, that the pulse frequency can be reduced by a factor of approximately 2 with the transmission quality unchanged.

As was found in practice in this known device, a sufficient frequency band must be reserved, for example, the band of 0–0.2 kHz for an accurate transmission of the envelope signal which under certain conditions means a restriction in the possibilities of application. Particularly, this appears to be the case if the signal to be transmitted comprises frequency components located in this band of 0–0.2 kHz or if additional signals of very low frequency must be transmitted as, for example, signalling frequencies.

It is an object of the invention to provide a different conception of a device of the last-mentioned group in which together with a particularly effective dynamic control for continuously varying signals the possibilities of application are widened, the device being further distinguished in that, in addition to a reduction of the instability problems in the control and a favorable insensitivity to interference, an influence on the reproducibility due to tolerances in the elements is obviated to a great extent. This device is also particularly suitable for designing in digital techniques and solid-state integration.

The device according to the invention is characterized in that the dynamic control voltage generator consists of a pulse pattern analyzer fed by the output pulses from the pulse code modulator; the analyzer successively analyzes the composition of the pulse patterns formed by the output pulses from the pulse code modulator within a fixed and a limited time interval of at least three successive pulses from the pulse generator and which, upon the occurrence of predetermined pulse patterns corresponding to a large instantaneous modulation index within the fixed time interval, supplies a pulse output voltage which is applied to an integrating network for generating the dynamic control voltage.

To increase the range of modulation and suppress whistling and interference tones at low pulse frequencies, according to a further aspect of the invention a control voltage balancing device is included in the local receiver and in the cooperating receiver, respectively; the device suppresses the DC component introduced by the dynamic control into the circuit of the local receiver and in the cooperating receiver, respectively.

Figure 2:
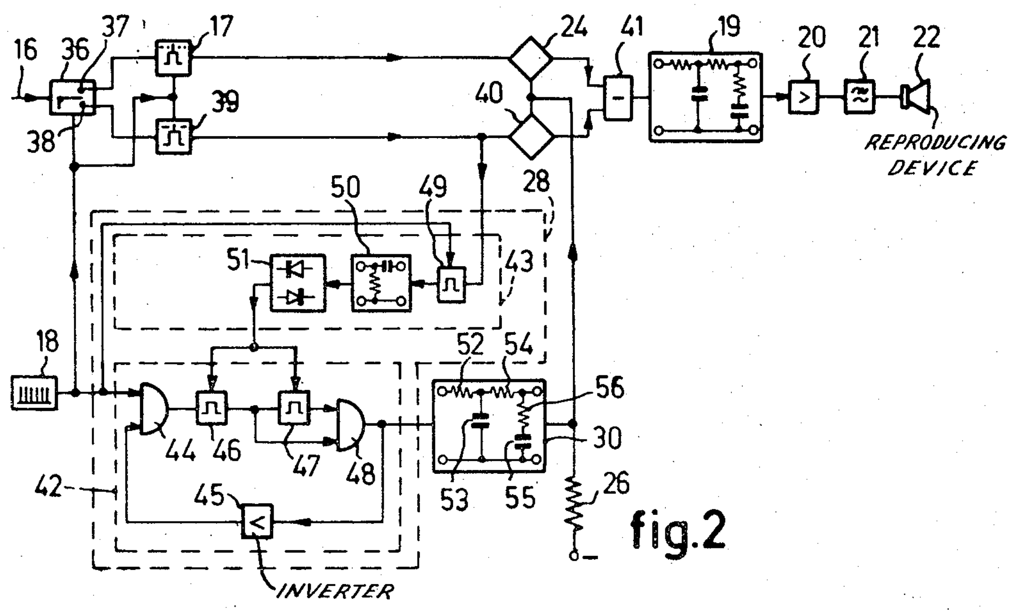
Figure 3:
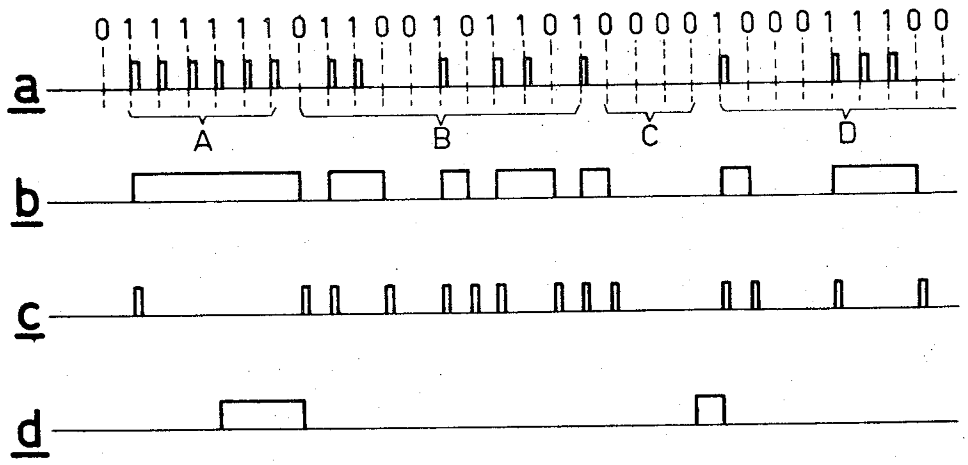
Figure 4:
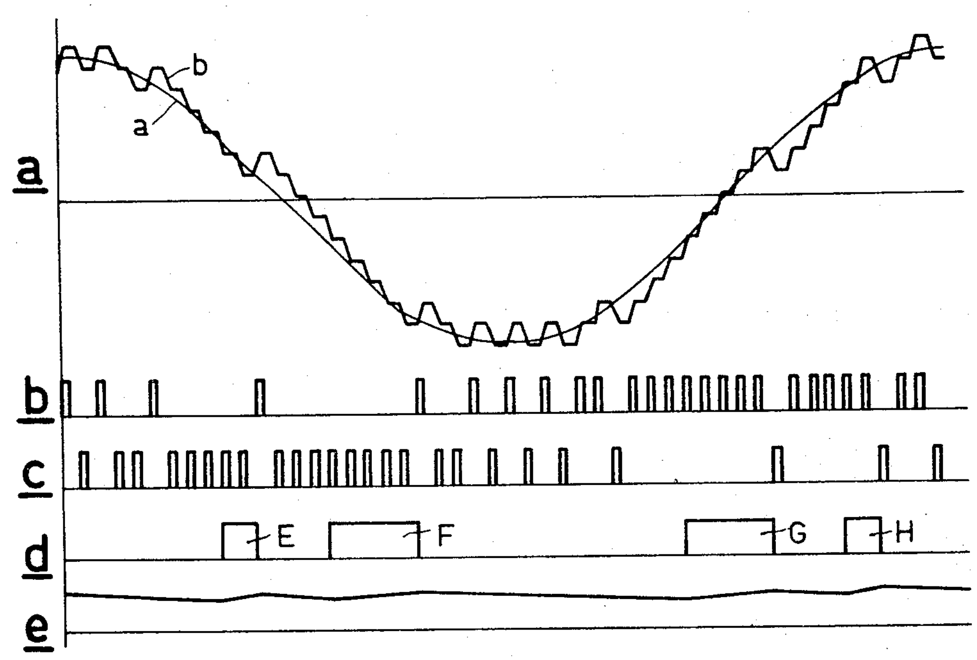
Figure 4:
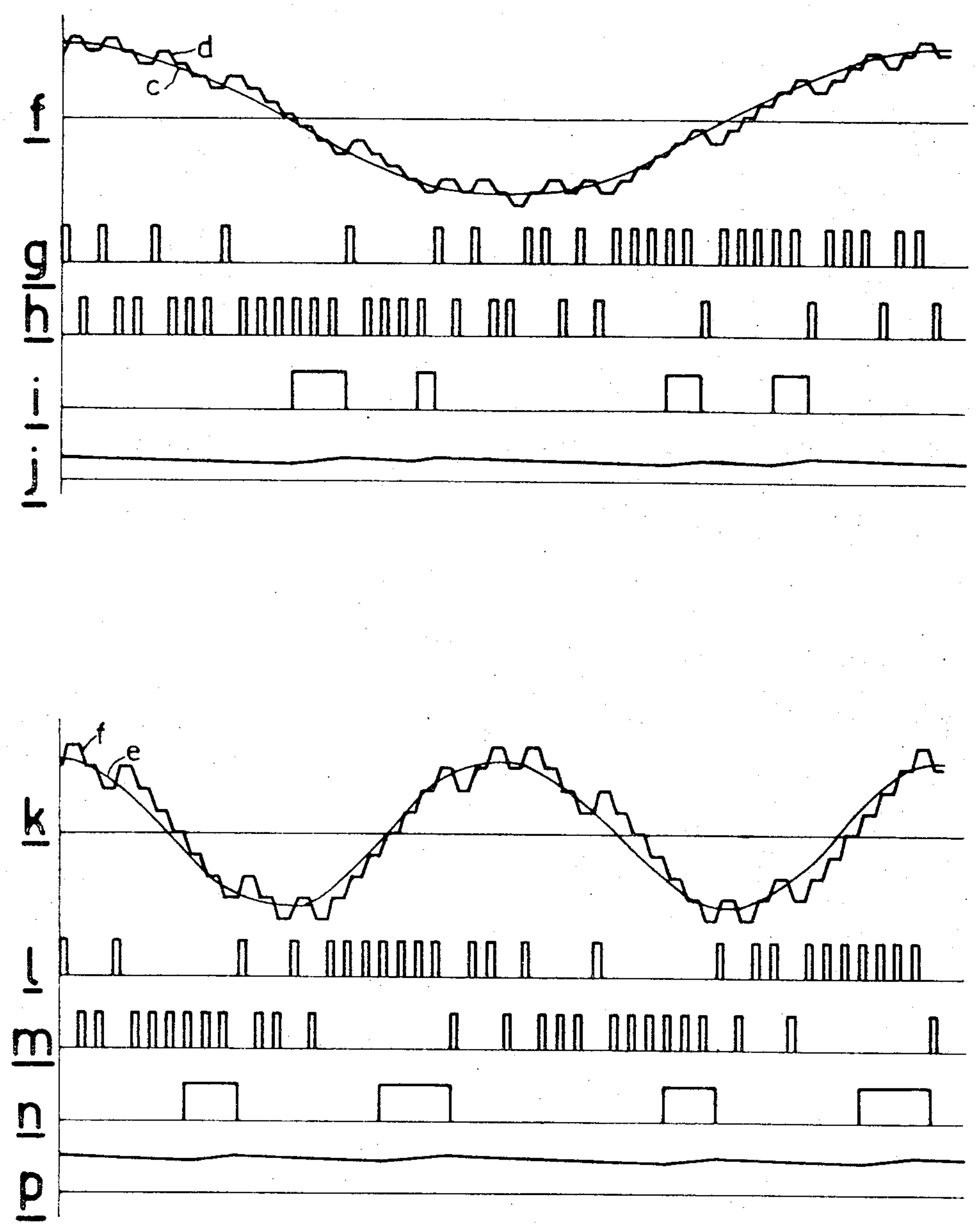
Figure 11:
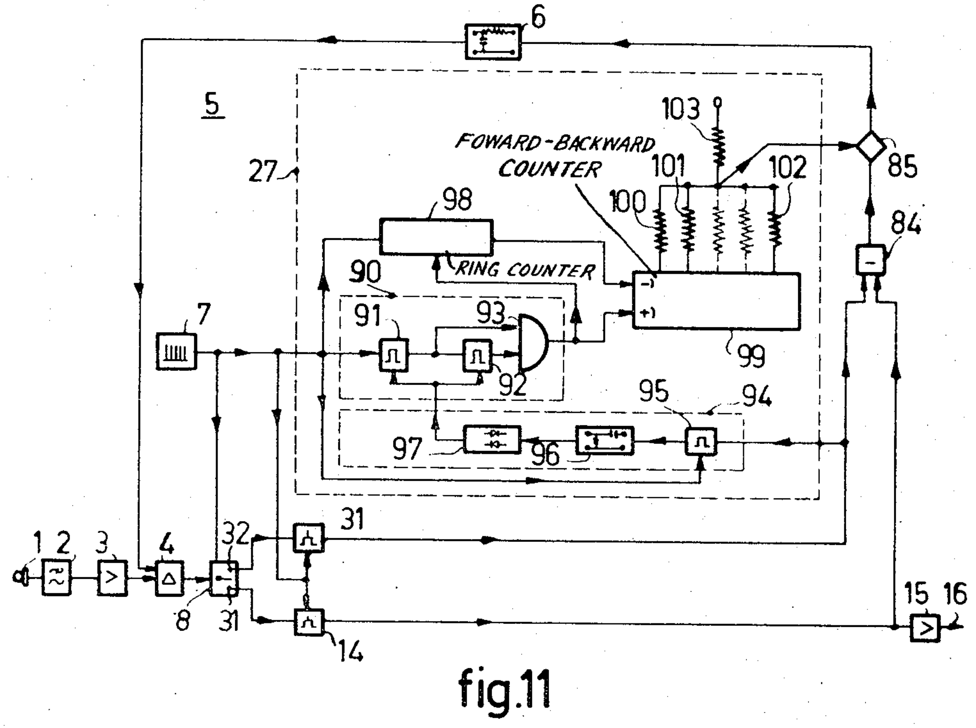
Figure 12:
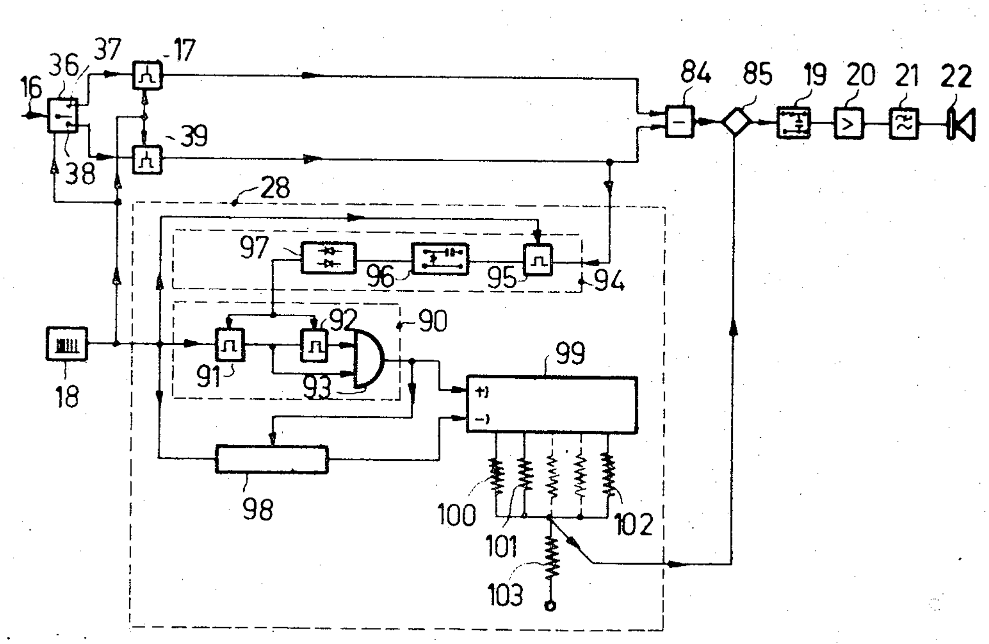
Figure 13:
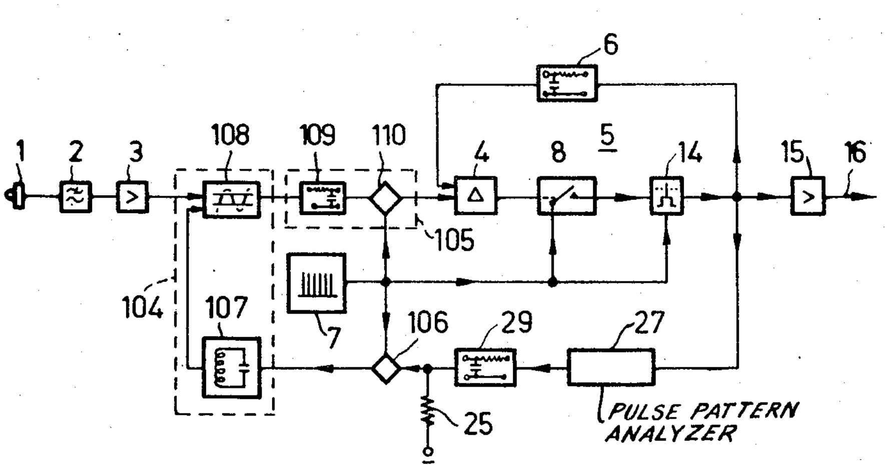

In order that the invention may be readily carried into effect a few embodiments thereof will now be described in detail by way of example with reference to the accompanying diagrammatic drawings, in which:

FIGS. 1 and 2 show a transmitter and a receiver, respectively, for delta modulation according to the invention, while FIGS. 3 and 4 show a few diagrams to explain the transmitter and receiver shown in FIGS. 1 and 2;

FIGS. 5–6, 7–8, 9–10, 11–12 show modifications of transmitters and receivers of the transmitter and receiver shown in FIG. 1 and FIG. 2, while FIG. 13 shows a further modification of a transmitter according to the invention.

The transmitter shown in a block diagram in FIG. 1 according to the invention is adapted for the transmission of continuous signals in the form of speech signals.

Particularly, the speech signals derived from a microphone 1 are applied through a speech filter 2 having a pass band of 0–3.4 kHz and a low-frequency amplifier 3 to a difference producer 4.

A comparison voltage for forming a difference voltage which controls a pulse code modulator 8 connected to a pulse generator 7 is set up at the difference producer 4 through a comparison circuit 5 provided with a local receiver incorporating an integrating network 6. The pulse generator 7 supplies periodic pulses having a repetition frequency which is one order of magnitude larger than the highest speech frequency to be transmitted.

In the transmitter shown, the integrating network 6 is formed in the manner as described in British Pat. specification 691,824 comprising the cascade circuit of a first section consisting of a series resistor 9 and a shunt capacitor 10 having a cut-off frequency of, for example, 200 Hz and a second section having a cut-off frequency which is at most equal to the highest speech frequency, for example, of 3,400 Hz consisting of a series resistor 11 and a shunt impedance formed by the series arrangement of a capacitor 12 and a coupling resistor 13. The coupling resistor 13 causes part of the output voltage of the first section to occur between the output terminals together with the integration voltage occurring at the capacitor 12.

Dependent on the polarity of the output voltage of the difference producer 4, pulses originating from the pulse generator 7 either occur at the output of the pulse code modulator 8 or they are suppressed. Pulses passed by the pulse code modulator 8 are, for example, indicated by 1 pulses while the suppressed pulses are indicated by 0 pulses.

Connected to the output of the pulse code modulator 8 supplying the 1 and 0 pulses in a pulse regenerator 14 for the suppression of the variations in amplitude, duration, shape or instant of occurrence of the pulses caused in the pulse code modulator 8, for example, this regeneration is effected by substitution of the applied pulses for pulses which are directly derived from the pulse generator 7. After amplification in a final amplifier 15 the regenerated pulses are transmitted through line 16 and possibly after modulation on a carrier to the cooperating receiver and are in addition applied to the comparison circuit 5 comprising a local receiver with the integrating network 6 at the output of which the previously mentioned comparison voltage is produced which is applied to the difference producer 4.

The device described continuously tends to render the difference voltage zero so that the comparison signal forms a quantized approximation of the input signal and, viewed in a time diagram, oscillates about the signal to be transmitted in a rhythm dependent on the pulse repetition frequency.

In this connection, it is to be noted that with delta modulation, unlike other types of pulse code modulation, the code pulses do not characterize every time the instantaneous value of the signal to be transmitted every time, but in essence indicate, at the instant of a pulse from the pulse generator 7, only the polarity of the difference between the relevant instantaneous value of the signal to be transmitted and the instantaneous value of the comparison signal at the instant of the immediately preceding pulse from the pulse generator. In this manner the code pulses characterize a signal value which is primarily dependent on the slope of the signal to be transmitted.

FIG. 2 shows a cooperating receiver to be used with the transmitter of FIG. 1. The code pulses received through line 16 and which may be distorted are substituted for locally generated pulses by means of a pulse regenerator 17 connected to a local pulse generator 18 to be synchronized with the pulse generator 7 of the transmitter. These regenerated pulses are applied to an integrating network 19 corresponding to the integrating network 6 of the local receiver incorporated in the comparison circuit 5 of the transmitter so that a voltage corresponding to the comparison voltage in the transmitter is produced at the output of the integrating network 19. The signal voltage is applied to a reproducing device 22 through a low-frequency amplifier 20 and a lowpass filter 21 which passes the desired speech frequency band and suppresses the frequencies located thereabove.

In the device described for the delta modulation, the quantization noise caused by the amplitude quantization occurs when reproducing the signals to be transmitted which noise, as is known per se, decreases as the frequency of the pulses from the pulse generator 7 increases, particularly in the device described the power of the quantization noise is inversely proportional to the fifth power of the frequency of the pulses from the pulse generator 7. On the other hand the quantization noise is substantially independent of the amplitude of the signal to be transmitted so that with a decreasing signal level the S/N-ratio between the signal and the quantization noise decreases proportionally, the quantization noise thus influencing in a disturbing manner the reproducing quality, particularly at low signal levels.

In order to reduce this disturbing influence on the reproducing quality by the quantization noise to a large extent, it is already known to control, by means of smoothed dynamic control voltage, the amplitude of the pulses applied to the transmitter ends and receiver ends of the integrating networks 6 and 19 in amplitude modulators 23 and 24, respectively. For this purpose, in the U.S. Pat. No. 3,249,870 already previously mentioned, the envelope signal obtained by rectification of the signals to be transmitted is applied to the difference producer 4 together with the signals to be transmitted so that the average pulse density varies linearly with the envelope signal and the control voltage for the control of the amplitude modulators 23 and 24 is obtained at the transmitter and receiver ends respectively by smoothing the transmitted pulse series. For a sensitive control, it is advantageous to have the amplitude of the pulses derived from the amplitude modulators 23 and 24 substantially proportional to the generated control voltage. This is achieved in a simple manner by applying a constant reference voltage as a modulation voltage to the amplitude modulators 23 and 24 through resistors 25 and 26, respectively, the amplitude of said voltage being adjusted in such a manner that in the absence of a signal to be transmitted, the amplitude of the pulses derived from the amplitude modulators 23 and 24 is largely reduced, for example, to 1 to 2 percent.

Excellent results were obtained in practice with the device described, but it cannot be used if the signal to be transmitted comprises components of very low frequency, for example, 100 Hz or if an additional signal of low frequency must be co-transmitted with the speech signals since the relevant frequency space is already occupied by the envelope signal.

The invention provides a different conception of such a device in which the limitation described is obviated in that the dynamic control voltage generator consists of pulse pattern analyzers 27 and 28 controlled by the output pulse from the pulse regenerators 33 and 39 respectively; these analyzers successively analyze the configuration of the pulse patterns formed by the output pulses within a fixed and limited time interval of at least three successive pulses from the pulse generator 7 and, upon the occurrence of predetermined pulse patterns which correspond to a large instantaneous modulation index within said fixed and limited time interval, provide a pulsatory output voltage which is applied to integrating networks 29 and 30 for generating the dynamic control voltage.

In the succession of said fixed time intervals which, as compared with one period of the continuously varying signals to be transmitted may be very short, for example approximately 10 percent of one period of the principal speech frequencies at a pulse frequency of 40 kHz the pulse pattern analyzers 27 and 28 successively analyze the occurrence or non-occurrence of the predetermined pulse patterns. Whenever such a predetermined pulse pattern occurs the pulse pattern analyzers 27 and 28 provide a pulsatory output voltage and the dynamic control voltage is comparatively quickly built up by integration of the output voltage of the pulse pattern analyzers 27 and 28 which dynamic control voltage causes the amplitudes of the pulses derived from the amplitude modulators 23 and 24 to vary in conformity with the dynamic control voltage. If necessary, the charge and discharge time constants of mutually equal integrating networks 29, 30 may be chosen to be different.

As will further be described hereinafter a particularly effective dynamic control will be achieved by the steps described in the transmission of continuously varying signals by delta modulation, but for obtaining optimum results it is important to suppress the varying D.C. current component introduced in the output pulses of the amplitude modulator 23 by modulation with the dynamic control voltage with the aid of a control voltage balancing device in the comparison circuit 5. In fact, since a transmitter for delta modulation has the property to compensate a signal introduced in the delta modulation loop, the average pulse density of the pulses derived from the pulse code modulator 8 will simultaneously start to vary for the purpose of compensation of the D.C. current component introduced in the output pulses of the amplitude modulator 23 which, inter alia, results in the fact that on the one hand the modulation range is reduced and on the other hand whistling and interference tones appear to occur at a low frequency of the pulses from the pulse generator 7, for example, less than 20 kHz.

In the embodiment shown, the pulse code modulator 8 also forms part of the control voltage balancing device by using a pulse code modulator 8 having a change-of-state contact, complimentary pulse series occurring at outputs 31, 32 of the pulse code modulator 8, for example, if a pulse series 1110010 occurs at the output 31 of the pulse code modulator 8, a pulse series 0001101 occurs at the output 32 of the pulse code modulator 8 which pulse series is handled in the delta modulation loop in exactly the same manner as the pulses at the output 31. Particularly, these pulses are applied through a pulse regenerator 33 controlled by the pulse generator 7 to an amplitude modulator 34 which is controlled by the control voltage of the pulse pattern analyzer 27. Thus, a complementary pulse series of equal amplitude relative to the pulse series at the output of the amplitude modulator 23 occurs at the output of the amplitude modulator 34, the pulse series at the outputs of the amplitude modulators 23, 24 being applied to the integrating network 6 through a difference producer 35 for suppression of the DC current component. Instead of the pulse series consisting of present and absent pulses, for example, the pulse series 1110010, a pulse series having pulses of opposite polarity of the form 111-1-11-1 is applied to the integrating network 6 with the aid of the control voltage balancing circuit described so that the DC current component varying with the dynamic control voltage of the pulse series applied to the integrating network 6 is balanced, thus obtaining optimum results with this device as already described hereinbefore.

The cooperating receiver of FIG. 2 is built up in the same manner as the local receiver at the transmitter end, particularly the pulses received through line 16 control a switch 36 having a change-of-state contact of the same kind as that of the pulse code modulator 8 of FIG. 1, the output 37 of the switch 36 being connected through pulse regenerator 17 to the amplitude modulator 24 and the complementary output 38 likewise being connected through pulse regenerator 39 to an amplitude modulator 40, both amplitude modulators 24, 40 being controlled by the pulse pattern analyzer 28, while the output circuits of amplitude modulators 24, 40 are connected through a difference producer 41 to the integrating network 19.

To obtain optimum results in the transmitters and receivers of FIG. 1 and FIG. 2, control voltage balancing devices are used in combination with the pulse pattern analyzers, 27, 28 respectively. The pulse pattern analyzers 27, 28 used in these devices are adapted to analyze pulse patterns within a time interval of four successive pulses from the pulse generator 7, the pulse pattern analyzers 27, 28 providing an output pulse only in a configuration of four successive 1 pulses or 0 pulses at one of the outputs 31, 32 of the pulse code modulators 8 and 37, 38, respectively, of the switch 36. Of the 24 different pulse configurations which are possible within this time interval at the outputs 31, 32 of the pulse code modulators 8 and 37, 38 of the switch 36, the pulse pattern analyzers 27, 28 then only provide an output pulse at 2 pulse configurations, namely when four 1 pulses or four 0 pulses occur successively.

Both pattern analyzers 27 and 28 at the transmitter end in FIG. 1 and at the receiver end in FIG. 2 respectively are built up in the same manner, corresponding elements being denoted by the same reference numerals. In their embodiments, these two pulse pattern analyzers 27, 28, which provide an output voltage only when four 1 pulses or four 0 pulses successively occur, prove to be very simple. In particular, these pulse pattern analyzers 27 and 28 are formed by a pulse counter 42 connected to the pulse generators 7 and 18, respectively, which counter counts up to four pulses, and a reset device 43 controlled by the pulses at the output of the pulse regenerator 33 and 39, respectively, which reset device returns the pulse counter 42 to its initial position in case of a perturbation of the successive occurrence of 1 pulses or 0 pulses from the relevant outputs of the pulse regenerators 33 and 39, respectively.

The pulse counter 42 is formed by the cascade arrangement of a selection gate in the form of an AND gate 44 to whose input the pulses from the pulse generators 7 and 18 and the output pulses from the pulse counter 42 are applied through an inverter 45, a bistable trigger 46 formed as a 2 to 1 divider, a further bistable trigger 47 formed as a 2 to 1 divider and a selection gate in the form of AND gate 48 to whose input the input and output voltages of the trigger 47 are applied, while the output voltage of the AND gate 48 is set up for dynamic control at the integrating networks 29 and 30 on the one hand and at the input of the AND gate 44 through the inverter 45 on the other hand.

The reset device 43 consists of a bistable trigger 49 controlled by pulses from the pulse generators 7 and 18 and the 1 and 0 pulses at the output 32 of the pulse code modulator 8 and the output 38 of switch 36, said bistable trigger occupying one balanced position when 1 pulses occur and the other balanced position when 0 pulses occur, and a differentiating network 50 and a two-phase rectifier 51. With each change of the successive occurrence of 1 pulses or 0 pulses at the output 32 of the pulse code modulator 8 and the output 38 of the switch 36, the bistable trigger 49 is reversed and a pulse of alternately positive and negative polarity is obtained by differentiation in the differentiating network 50 which pulses, after conversion in the two-phase rectifier 51 into pulses of one polarity, are applied as reset pulses to the two bistable triggers 46, 47.

To explain the operation of the pulse pattern analyzers 27 and 28 described, FIG. 3 shows a few time diagrams, in which FIG. 3*a* represents a pulse series originating from the output 32 of the pulse code modulator 8 and from the output 38 of the switch 36 which pulse series is composed of 1 and 0 pulses. If the bistable trigger 49 of the reset device 43 has an output voltage of 1 or 0 in its two balanced positions when a 1 pulse or a 0 pulse occurs, a voltage of the form shown in FIG. 3*b* will occur at the output of the bistable trigger 49 as a result of the pulse series illustrated in FIG. 3*a*, the pulse series of positive pulses shown in FIG. 3*c* being obtained by differentiation in the differentiating network 50 of the pulse series illustrated in FIG. 3*b* and after conversion in the rectifier 51. With each change of the successive occurrence of a series of 1 pulses or 0 pulses of the pulse series shown in FIG. 3*a* a reset pulse is produced in this manner which returns the pulse counter 42 to its initial position.

To check the operation of the pulse counter 42 when the pulse series of FIG. 3*a* occurs the starting point will be that the pulse pattern indicated by A in FIG. 3*a* consisting of six successive 1 pulses is applied to the pulse pattern analyzers 27 and 28. As may be apparent from FIG. 3*c* the reset device 43 produces a reset pulse for the pulse counter 42 upon the first pulse of the pulse pattern A so that the pulse counter 42 is returned to its initial position or position 1, that is to say, the bistable triggers 46, 47 have a voltage 0 as well as the output voltage of the AND gate 48, while a voltage 1 is set up at the input of the AND gate 44 through the inverter 45.

At the second pulse of the pulse pattern A the pulse corresponding thereto from the pulse generator 7 and 18 is passed by the AND gate 44 which causes the bistable trigger 46 to be reversed and position 2 of the pulse counter 42 occurs, the output voltages of the bistable triggers 46, 47 and of AND gate 48 and of the inverter 45 being 1, 0, 0, 1, respectively.

At the third pulse of the pulse pattern A the relevant pulse from the pulse generators 7 and 18 is passed by the AND gate 44 which causes the bistable trigger 46 to be reversed to its original balanced position so that also the bistable trigger 42 is brought to its other balanced position and position 3 of the pulse counter 42 occurs, the output voltages of the bistable triggers 46, 47, and AND gate 48 and of the inverter 45 being 0, 1, 0, 1, respectively.

At the fourth pulse of the pulse pattern A in which position 4 or the final position of the pulse counter 42 occurs the relevant pulse from the pulse generators 7 and 18 passes the AND gate 44 which again causes the bistable trigger 46 to be reversed to its other balanced position so that the AND gate 48 produces a voltage 1 since the input and output voltages of the bistable trigger 47 are both 1. In this final position of the pulse counter 42 the output voltages of the bistable triggers 46, 47, the AND gate 48 and of the inverter 45 are 1, 1, 1, 0, respectively; the AND gate 44 is now blocked for pulses from the pulse generators 7 and 18 since a voltage 0 is applied to the input of the AND gate 44 through the inverter 45.

At the fifth pulse of the pulse pattern A, that is to say, the pulse pattern composed of four pulses are reckened from the second pulse of the pulse pattern, the AND gate 44 thus does not pass a pulse and the pulse counter remains in its final position, the AND gate 48 continuing to apply an output voltage to the integrating networks 29 and 30 as well as at the sixth pulse of the pulse pattern A until the pulse counter 42 is returned to its initial position through the reset device 43 due to the occurrence of the first pulse in the subsequent pulse pattern B which is formed by a 0 pulse.

In the pulse pattern A composed of 1 pulses and comprising three pulse patterns of each time four successive 1 pulses as reckoned from the 1st, 2nd and 3rd pulses of the pulse pattern A the pulse pattern analyzers 27 and 28 supply a pulse having a duration which is equal to three times the period of the pulses from the pulse generators 7 and 18.

Only when at least four equal pulse elements successively occur can the pulse counter 42 reach its final position and supply an output pulse, since otherwise the pulse counter 42 is returned to its initial position by a reset pulse from the reset device 43 already before reaching this final position. Thus four successive 1 or 0 pulses nowhere appear in the pulse pattern B and accordingly no output pulse will be supplied by the pulse pattern analyzers 27 and 28.

In the next following pulse pattern C, four successive 0 pulses occur and the pulse pattern analyzers 27 and 28 will produce a positive output pulse in the manner as already described for pulse pattern A. At the first 1 pulse of the subsequent pulse pattern D, the pulse counter 42 is again returned to its initial position by means of a reset pulse from the reset device 43 and the pulse pattern analyzers 27 and 28 produce an output pulse having a duration which is equal to one period of the pulses from the pulse generators 7 and 18. During the subsequent pulse pattern D, the pulse pattern analyzers 27 and 28 produce no further output pulse.

As a result of the pulse series of FIG. 3*a* the pulse pattern analyzer 27 and 28 will thus produce the pulses shown in FIG. 3*d* the amplitudes of which have a constant value as may be apparent from FIG. 3*d* and which are equal as regards their duration to an integer number multiplied by the period of the pulses from the pulse generators 7 and 18, particularly the duration of the output pulse of the pulse pattern analyzers 27 and 28 associated with pulse pattern A of FIG. 3*a* is equal to three times and, with pulse pattern C, is equal to once the pulse period of the pulses from the pulse generators 7 and 18. The dynamic control voltage of the continuously varying signals is obtained in a delta modulation device by integration in the integrating networks 29 and 30 from the output pulses of the pulse pattern analyzers 27 and 28, said control voltage being set up at the amplitude modulators 23, 34 and 24, 40, respectively, for amplitude control of the pulses applied to the integrating networks 6 and 19, respectively. In the transmitter of FIG. 1 the output voltage of the integrating network 6 is compared in the difference producer 4 with the signals to be transmitted while in the receiver of FIG. 2 the output voltage of the integrating network 19 is applied through amplifier 20 and low-pass filter 21 to the reproducing device 22.

In the pulse pattern analyzers 27 and 28 used, it is achieved on the one hand that its output voltage is to a far extent independent of occurring tolerances in its elements and on the other hand there is the certainty of a full synchronization of the output voltage of the two pulse pattern analyzers 27 and 28 at the transmitter and receiver ends. Problems of instability are then entirely controlled while as a result of the digital embodiment of the pulse pattern analyzers 27 and 28 and of the great independence of the tolerances in the elements the devices described are eminently suitable for solid-state integration.

Together with referenced advantages, a particularly effective dynamic control is obtained with the device according to the invention for the transmission of continuously varying signals by means of delta modulation which results in an optimum reduction of the quantization noise as will now be explained with reference to the time diagrams shown in FIG. 4.

The curve *a* of FIG. 4 shows a speech frequency of 800 Hz and an amplitude of 4 Volt which is transmitted by the transmitter, for delta modulation of FIG. 1 at a pulse frequency of 40 kHz of the pulse generators 7 and 18, that is to say 50 1 and 0 pulses are transmitted within a period of the speech frequency. The curve *b* shows the steplike comparison signal occurring at the output of the integrating networks 6 and 19, the amplitude of one step being given by the amplitude of the pulses derived from the amplitude modulators 23, 34 and 24, 40, respectively, the amplitudes of said pulses being controlled through the integrating networks 29, 30 by the output voltage of the pulse pattern analyzers 27, 28 while FIG. 4*b* and FIG. 4*c* show the pulses occurring at the outputs 31, 32 respectively of the pulse code modulator 8 and at the outputs 37, 38 respectively of switch 36.

In the successive fixed time intervals of 100$\mu$sec of four successive pulses from the pulse generators 7 and 18 corresponding to approximately one-tenth period of the signal *a* to be transmitted of FIG. 4*a* the pulse pattern analyzers 27 and 28 analyze the transmitted pulse series in the manner as already described hereinbefore. Whenever four successive 1 or 0 pulses occur in the pulse series of FIG. 4*b* and FIG. 4*c*, respectively, which characterizes a maximum instantaneous modulation index of the delta modulation device within said fixed time interval, since in fact the signal to be transmitted will vary at a maximum value within this short time interval, the pulse pattern analyzers 27, 28 will produce an output pulse having a duration which is equal to one period of the pulses from the pulse generators 7 and 18, respectively.

Consequently, the pulse pattern analyzers 27 and 28 will produce the pulses shown in FIG. 4*d* due to the signal to be transmitted indicated by *a* in FIG. 4*a*, said pulses being indicated by E, F, G, H; pulse E has a duration of twice one period of the pulses from the pulse generators 7 and 18 as a result of the successive occurrence of five 0 pulses in the transmitted pulse series which thus includes two successive pulse patterns of four 0 pulses each; pulse F has a duration of five times one period of the pulses from the pulse generators 7 and 18 as a result of the successive occurrence of eight 0 pulses which thus include five successive pulse patterns of four 0 pulses each, while likewise the pulses G and H have a duration of five times and twice one period, respectively, of the pulses from the pulse generators 7 and 18 as a result of the successive occurrence of eight and five 1 pulses each. Viewed over a certain time interval particularly within one period of the signal *a* to be transmitted, the pulse pattern analyzers 27, 28 indicate, in pulses having the fixed duration of one period of the pulses from the pulse generators 7 and 18, the number of times that the delta modulation device has a maximum instantaneous modulation index in excess of the short time interval of four successive pulses, for example, for the signal to be transmitted indicated by *a*, FIG. 4*d* shows that this is the case $2 + 5 + 5 + 2 = 14$ times. A dynamic control voltage varying with the average modulation index of the signal to be transmitted and shown on an enlarged scale in FIG. 4*e* is produced by integration in the integrating networks 29 and 30 from these pulses of the pulse pattern analyzers 27 and 28 every time characterizing a maximum modulation index.

In this manner, a particularly effective dynamic control appears to be obtained for delta modulation as is also evident from FIG. 4*a*, namely the size of the steps in the comparison signal and thus the amplitude of the pulses applied to the integrating networks 6 and 19 appear to be adjusted by the control voltage at a value such that the device for delta modulation is exactly fully loaded which in delta modulation means a maximum S/N ratio between signal and quantization noise.

Actually, it has been achieved in the device according to the invention that the pulse pattern analyzer 27 for producing the dynamic control voltage also forms part of a loop of the delta modulation type which is further formed by the integrating network 29 which is connected through amplitude modulators 23, 34 and integrating network 6 to the difference producer 4 and back through the pulse code modulator 8 to the pulse pattern analyzer 27. In particular, the output signal of the integrating network 29 is compared in the difference producer 4 with the modulation index given by the signals to be transmitted after conversion in the amplitude modulator 23 and recovering in the integrating network 6 so as to form a difference signal which controls the pulse pattern analyzer 27 through the pulse code modulator 8. Exactly as in delta modulation, a pulse of constant amplitude and duration will be transmitted or suppressed by the pulse pattern analyzer 27 dependent on the polarity of the difference signal and exactly as in delta modulation the output signal of the integrating network 29 will attempt to follow the modulation index given by the signal to be transmitted.

Investigations have shown that the loop for generating the dynamic control voltage satisfies the properties for delta modulation. Thus, it is, inter alia, advantageous not only to connect an integrating network 29 or 30 to a single section consisting of a series resistor 52 and a shunt capacitor 53 to cut-off frequency of which is preferably in the order of the low variation frequency in the modulation index of the signal to be transmitted, for example, 30 Hz, but also to connect in cascade therewith a second section the cut off frequency of which is higher than that of the first section, for example, 60 Hz. This second section is advantageously formed by a series resistor 54 and a shunt impedance consisting of the series arrangement of a capacitor 55 and a coupling resistor 56, which coupling resistor 56 causes part of the output voltage of the first section 52, 53 to occur between the output terminals together with the voltage occurring at the capacitor 55.

An advantageous proportioning of the elements of the double integrating network shown is the following:

| | |
|---|---|
| Resistor **52** : 1 kΩ | Capacitor **53** : 5 μF |
| Resistor **54** : 1 k | Capacitor **55** : 2,5 μF |
| Resistor **56** : 100 Ω | |

Characteristic of the device described according to the invention is that a control voltage is built up in the integrating networks 29 and 30 in the loop of the delta modulation type formed fro dynamic control from the pulses of the pulse pattern analyzers 27 and 28 which pulses characterize a maximum instantaneous modulation index, said control voltage following the modulation index given by the signals to be transmitted. As a result the device according to the invention will exactly be fully loaded which, as already described in the foregoing, means a maximum S/N-ratio between signal and quantization noise in delta modulation.

For illustration of the effect described, FIGS. 4*f*–4*j* show further time diagrams. Thus the curve *c* of FIG. 4*f* shows in comparison with the curve *a* of FIG. 4*a* a speech signal of the same frequency but of half the amplitude, particularly the frequency is 800 Hz and the amplitude is 2 volt. The curve *d* shows the associated comparison signal while the time diagrams 4*g* and 4*h*; 4*i*, 4*j* show successively the pulses at the outputs 31, 32 of the pulse code modulator 8 and at the outputs 37, 38 of the switch 36, the output pulses of the pulse pattern analyzers 27 and 28 and the control voltage produced. As a result of this amplitude decrease by 50 percent in the signal to be transmitted, the number of pulses of the pulse pattern analyzers 27, 28 having a duration equal to one period of the pulses from the pulse generators 7 and 18 decreases from 14 to 8 (compare FIG. 14*i*) within the duration of one period of the speech frequency of 800 Hz and due to the decrease of the control voltage a decrease of the size of the steps in the comparison signal occurs such that the device for delta modulation is exactly fully loaded by the comparison signal *d* as is apparent from FIG. 4*f*.

In order to know the behavior of the device for delta modulation for a different speech frequency, FIGS. 4*k* – 4*p* show the relevant time diagrams, namely, since in delta modulation the code pulse characterize a signal value which is primarily dependent on the slope of the signals to be transmitted the modulation index in delta modulation is not only dependent on the amplitude but also on the frequency. However, also in this case a maximum S/N-ratio between signal and quantization noise is achieved as may be apparent from the following time diagram in FIGS. 4*k*–4*p*.

To this end, FIG. 4*k* shows a speech signal indicated by *e* which, as compared with the speech signal *c* of FIG. 4*f*, has the double frequency but an equal amplitude, particularly the frequency is 1,600 c/s and the amplitude is 2 Volt. The curve *f* shows the associated comparison signal, while the time diagram of FIG. 4*l* and 4*m*; 4*n* ; 4*p* again successively illustrate the pulses at the outputs 31, 32 of the pulse code modulator 8 and at the outputs 37, 38 of the switch 36, the output pulses of the pulse pattern analyzers 27 and 28 and the produced control voltage. As a result of this increase of the speech frequency the number of pulses of the pulse pattern analyzers 27 and 28 will be increased from 7 to 14 as is apparent from FIG. 4*n* over the same duration as in FIG. 4*i*, that is to say, one period of the frequency of 800 c/s or two periods of 1,600 c/s and it appears that due to the corresponding increase of the control voltage the size of the steps in the comparison signal *f* of FIG. 4*k* is enlarged to such an extent that the device for delta modulation is fully loaded.

From the time diagrams shown in FIG. 4, particularly from the comparison signals *b*, *d*, *f* of FIGS. 4*a*, 4*f* and 4*k* it is not only apparent that the S/N-ratio between signal and quantization noise is adjusted to a maximum value by using the pulse pattern analyzers 27 and 28 substantially independent of signal level and signal frequency, but the effect of the control voltage balancing device consisting in that the average pulse density has remained constant under all these circumstances also appears from the pulses at the outputs 31, 32 of the pulse code modulator 8 and at the outputs 37, 38 of the switch 36 (compare FIG. 4*b* and FIG. 4*c*; 4*g* and 4*h*; 4*l* and 4*m*). In fact, as may be apparent from these FIGS., 25 1 pulses and 25 0 pulses appear within the duration of 1 signal period of 800 Hz or 2 signal periods of 1,600 Hz corresponding to the duration of 50 pulses from the pulse generators 7 and 18 at the outputs 31, 32 of the pulse code modulator 8 and at the outputs 37, 38 of the switch 36, thus this means that a maximum modulation range is always ensured due to the control voltage balancing device independent of signal level and signal frequency, while the occurrence of whistling and interference tones is avoided at low pulse frequencies.

Together with the advantages achieved of this device according to the invention, namely an increase of the possibilities of application, great independence of occurring tolerances in the elements, no problem of stability and particularly suitable construction for solid-state integration it is always ensured that the S/N-ratio between signal and quantization noise has a maximum value at a maximum modulation range. Thus, at a pulse frequency of approximately 40 kHz optimum results were obtained by analyzing every time pulse patterns in the pulse analyzers 27 and 28 within a time interval of 4 successive pulses from the pulse generators 7 and 18.

When decreasing the pulse frequency, for example,to approximately 20 kHz it is advantageous to reduce the analyzing time of the pulse pattern analyzers 27, 28 to 3 successive pulses from the pulse generators 7 and 18 in connection with the reduction of the number of code pulses per period of the speech frequency, which analyzing time of the pulse pattern analyzers 27 and 28 can, however, not be further reduced to the duration of two successive pulses from the pulse generators 7 and 18. In fact, in that case the modulation index can no longer be determined since in the absence of a speech signal the device for delta modulation transmits not only the regular pulse pattern consisting of alternately occurring 1 and 0 pulses but also, with as much probability, the regular pulse pattern having alternately two successive 1 pulses and two successive 0 pulses, which last-mentioned pulse pattern would then erroneously be interpreted by the pulse pattern analyzers 27, 28 as a signal having a maximum modulation index. Therefore, the analyzing time of the pulse pattern analyzers 27 and 28 in the device according to the invention must be at least equal to the duration of three successive pulses.

In addition to the advantages already mentioned, the device according to the invention is distinguished by the high insensitivity to interferences occurring, namely, as interference pulse must simultaneously satisfy two conditions if it is to become effective at the level control, namely that firstly a transmitted pulse is converted into the complementary pulse, for example, a 0 pulse into a 1 pulse and that secondly the variation in the pulse pattern to be analyzed by the pulse pattern analyzers 27 and 28 caused by this interference pulse results in an erroneous responding of the pulse pattern analyzers 27, 28, for example, in the case of the above-mentioned pulse pattern having alternately two successive 1 pulses and two successive 0 pulses two successive interference pulses of a complementary sign are required in the absence of a speech signal. Experiments with connections having a strong interference level have shown that an effective interference discrimination was achieved even at chances of interference of up to approximately 10 percent the interfering action of the interference pulses was found to be reduced to a considerable extent.

Figure 5:
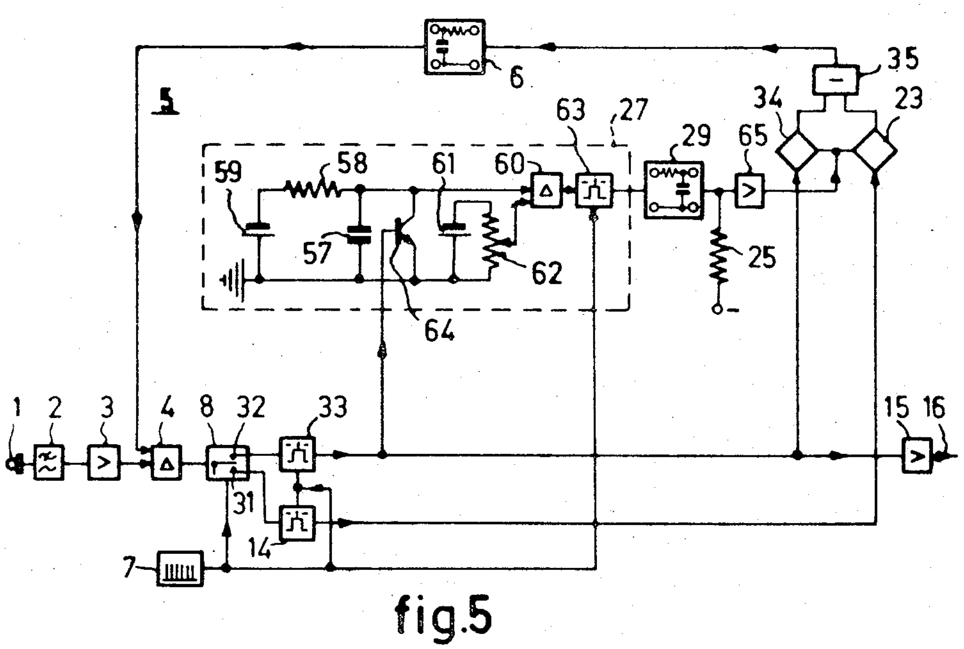
Figure 6:
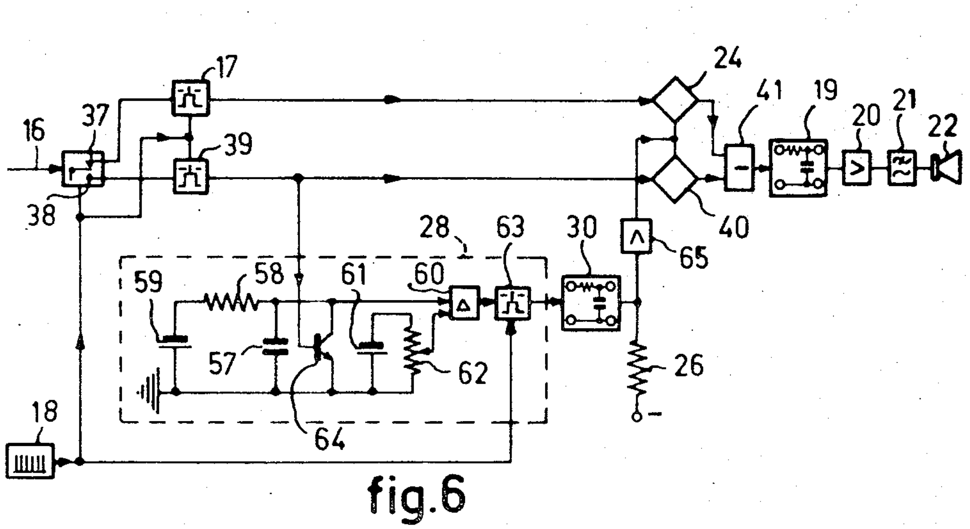

FIGS. 5 and 6 show a modification of the transmission device shown in FIGS. 1 and 2, FIG. 5 showing the transmitter and FIG. 6 showing the receiver. Corresponding elements have been denoted by the same reference numerals.

As in FIG. 1 and FIG. 2, this transmission device employs at the transmitter and receiver ends a control voltage balancing device as well as pulse pattern analyzers 27 and 28 in the form of a pulse counter for successively analyzing the configuration of pulse configurations occurring at one of the outputs 31, 32 of the pulse code modulator 8 and at one of the outputs 37, 38 of the switch 36 within a time interval, of, for example, 4 successive pulses from the pulse generators 7 and 18, the output pulses of the pulse counters 27 and 28 being applied to the integrating network 29 and 30 for generating the control voltage for the dynamic control.

To simplify the pulse counter, use is made of the property indicated in the time diagrams of FIG. 4*d*, FIG. 4*i* and FIG. 4*n* in the transmission of speech signals by the device according to the invention, namely, that within one period of a speech frequency the number of pulses produced by the pulse pattern analyzers 27, 28 as a result of 4 successive 0 pulses is substantially equal to the number of pulses as a result of 4 successive 1 pulses, that is to say, in a satisfactory approximation pulse pattern analyzers 27 and 28 may be sufficient which supply an output pulse when either four 1 pulses or four 0 pulses successively occur. In the embodiments shown in FIG. 5 and FIG. 6, the pulse pattern analyzers 27 and 28 produce an output pulse only when 4 successive 0 pulses occur at the output 32 of the pulse code modulator 8 and at the output 39 of the switch 36, consequently not when 4 successive 1 pulses occur.

In this embodiment, the pulse counter includes a charge capacitor 57 which is charged through a resistor 58 by a constant supply voltage source 59 succeeded by a comparison stage 60 for comparing the capacitor voltage with a constant reference voltage originating from a potential divider 62 connected between the terminals of a supply voltage source 61 and a normally blocked pulse regenerator 63 which is also controlled by the pulses from the pulse regenerators 7 and 18. The reference voltage produced by the potential divider 62 is adjusted to a value such that the reference voltage is exceeded by the voltage of the charge capacitor 57 initially within the duration of the 4 successive pulses from the pulse generators 7 and 18 and produced an input voltage for the pulse regenerator 63 which releases this regenerator for the pulses from the pulse generators 7 and 18.

The pulse pattern analyzers 27 and 28 are also provided with a reset device controlled by the pulses at the output 32 of the pulse code modulator 8 and at the output 38 of the switch 36 which reset device is formed as a discharge circuit connected parallel to the charge capacitor 57 and provided with a normally blocked transistor 64 which is released when a 1 pulse occurs and hence brings about a discharge of the capacitor 57.

If a series of at least 4 successive 0 pulses occurs at the output 32 of the pulse code modulator 8 and at the output 38 of the switch 36 the reference voltage of the comparison stage 60 will be exceeded at the fourth 0 pulse and a voltage will be applied by the comparison stage 60 to the pulse regenerator 63 which voltage releases the pulse regenerator 63 for the pulses from the pulse generators 7 and 18. Whenever a 0 pulse of the pulse code modulator 8 occurs, the pulse regenerator 63 applies a pulse of constant duration an amplitude to the integrating networks 29 and 30 until the charge capacitor 57 is discharged through the transistor 64 at a 1 pulse of the pulse code modulator 8 so that the voltage of the charge capacitor 57 decreases below the reference voltage and the pulse regenerator 63 is blocked for pulses from the pulse generators 7 and 18. With pulse patterns of fewer than 4 successive 0 pulses or pulse patterns consisting of 1 pulses the charge capacitor 57 does not get an opportunity to exceed the reference voltage so that the pulse regenerator 63 remains blocked for the pulses from the pulse generators 7 and 18 and no pulses are applied to the integrating networks 29 and 30.

Consequently, the pulse regenerator 36 will apply a number of pulses of constant duration and amplitude per unit of time to the integrating networks 29 and 30 which pulses correspond in number with the number of pulse patterns of four successive 0 pulses and the dynamic control of the delta modulation device is then brought about in the manner as already described in FIGS. 1 and 2. Although this device is also independent to a large extent of tolerances occurring in the elements attention must be paid in this device to the adjustment of the reference voltage, namely such that the reference voltage is exceeded between 3 and 4 successive 0 pulses.

In order to be able to quickly follow sudden variations in dynamic control, it is found to be advantageous to incorporate an amplifier 65 which has and exponentially varying amplification characteristic between the integrating networks 29 and 30 and the amplitude modulators 23, 34 and 24, 40, respectively.

Figure 7:
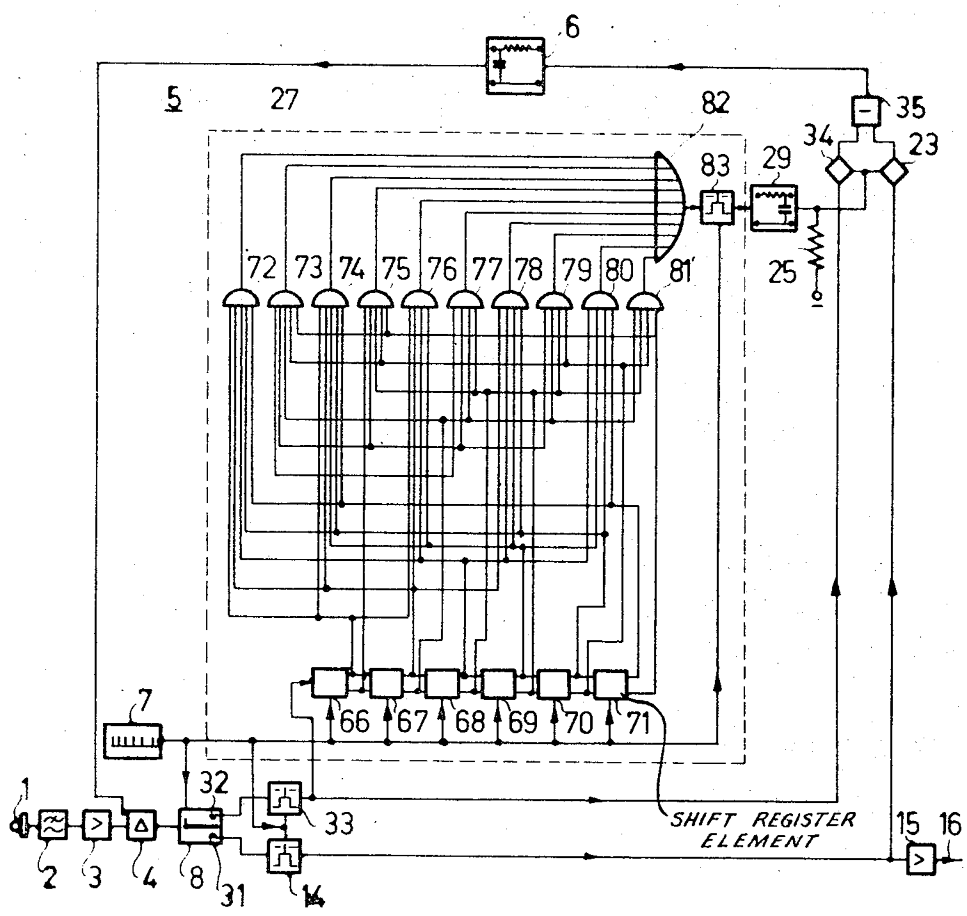
Figure 8:
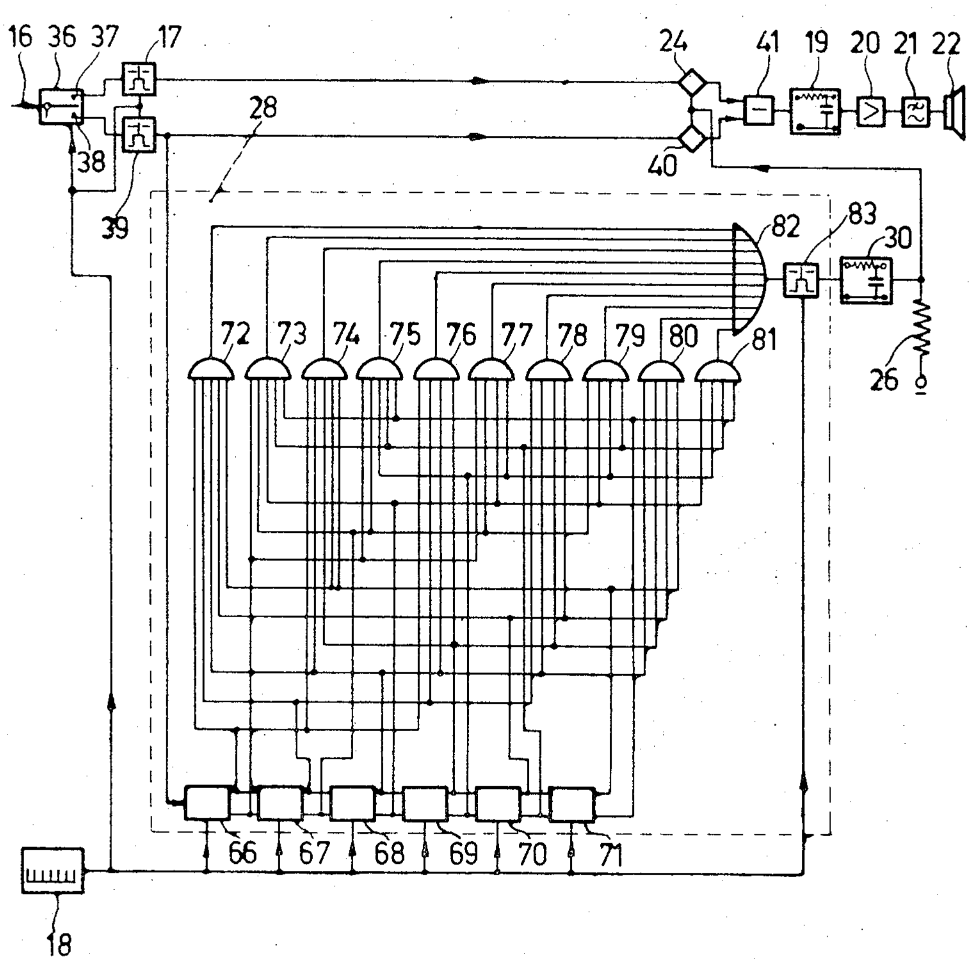

FIG. 7 and FIG. 8 show modifications of the delta modulation transmitters and receivers described hereinbefore. Corresponding elements are denoted by the same reference numerals.

While in the devices described the pulse pattern analyzers 27, 28 supply an output pulse only when a number of 1 or 0 pulses successively occurs at one of the outputs of the pulse code modulator 8 or the switch 36 for generating the control voltage serving for the dynamic control, for example, in the embodiments of FIGS. 1 and 2 when 4 successive 1 or 0 pulses occur, different pulse patterns are used for the dynamic control in the embodiments of FIGS. 7 and 8 which pulse patterns correspond to a large instantaneous modulation index. Particularly in the devices of FIG. 7 and FIG. 8 successive pulse patterns in a duration of 6 successive pulses from the pulse generators 7 and 18 are analyzed in the pulse pattern analyzers 27 and 28, the pulse pattern analyzers 27, 28 only supplying an output pulse for the pulse patterns which cause an amplitude variation of at least four steps within the said duration in the comparison signal in the integrating networks 6, 19.

This condition is only satisfied by a limited number of the $2^6$ different configurations within this duration of 6 successive pulses from the pulse generators 7 and 18, namely the pulse patterns having six and having five equal pulses, partly the pulse patterns having four equal pulses and none of the pulse patterns having three equal pulses. For example, the pulse pattern 111100 satisfies this condition since the comparison signal varies by four steps due to the successive occurrence of four 1 pulses, but not the pulse pattern 101110 since in this case the comparison signal only varies by three steps at a maximum.

Thus, it is found that only the following pulse pattern configurations of the $2^6$ different pulse pattern configurations meet the conditions imposed, the complementary pulse pattern configurations A and B being illustrated side by side.

| A | B |
|---|---|
| 111111 | 000000 |
| 111110 | 000001 |
| 111101 | 000010 |
| 111011 | 000100 |
| 110111 | 001000 |
| 101111 | 010000 |
| 011111 | 100000 |
| 111100 | 000011 |
| 011110 | 100001 |
| 001111 | 110000 |

When each pulse configuration indicated by A and B occurs, the pulse pattern analyzers 27 and 28 supply an output pulse which is applied for dynamic control to the integrating networks 29, 30+ In their embodiments the pulse pattern analyzers 27 and 28 consist of a shift register fed by the output pulses of the pulse code modulator 8 and provided with six shift register elements 66 – 71 in the form of bistable triggers having two complementary outputs, the contents of the shift register elements 66 – 70 being shifted by the pulses from the pulse generators 7 and 18.

Furthermore, the pulse pattern analyzers 27, 28 include ten selection gates in the form of AND gates 72–81 which are connected in the manner as shown in FIGS. 7 and 8 to the complementary outputs of the shift register elements 66 – 71 and a selection gate in the form of an OR gate 82 connected to all outputs of the AND gate which OR gate is connected to the integrating networks 29 and 30 through a pulse regenerator 83 controlled by the pulse generators 7 and 18.

As can easily be verified, it is achieved due to the connections shown in the FIG. between the outputs of the shift register elements 66 – 71 and the AND gates 72–81 that when the pulse configurations indicated by A and B occur, at least one of the AND gates 72 – 81 applies a pulse to the OR gate 82 so that a pulse of constant duration and amplitude is applied to the integrating networks 29 and 30 through the OR gate 82 by the pulse regenerator 83. For example, in the pulse pattern 111100 in the series of pulse pattern configurations A, 1 and 0 pulses will occur in this order at the + output of the shift register elements 66 – 71 and hence a 1 pulse at all inputs of the AND gate 76 as a result of which a pulse is supplied by the AND gate 76 which is applied through the OR gate 82 and pulse regenerator 83 to the integrating networks 29 and 30 for the purpose of dynamic control. On the other hand, in the pulse pattern 101110 exclusively 1 pulses will not be applied to the inputs of any of the 10 AND gates 72–81 so that none of the AND gates 72–81 provides a pulse and hence no pulse is applied through the OR gate 82 to the integrating networks 29, 30 which should indeed be the case since the pulse pattern 101110 does not occur in the pulse configurations A and B.

The dynamic control voltage is built up in the manner as already described in the preceding Figures from the pulse patterns which characterize a large instantaneous modulation index within the limited time interval of 6 successive pulses by means of the pulse pattern analyzers 27 and 28 and the integrating networks 29 and 30 and in this case too a particularly effective dynamic control is achieved in a transmission device for delta modulation of continuously varying signals which thus corresponds to a maximum ratio between signal and quantization noise.

In this device, use is made of the detail structure of the pulse patterns in the limited analyzing time interval and the pulse pattern analyzers 27 and 28 of the type indicated provide the possibility of analyzing any desired pulse pattern so that a large extent of freedom is obtained for adjusting the dynamic control characteristic which under circumstances may be of special advantage. Thus it is found that for delta modulation transmission at low pulse frequencies, for example, 20 kHz or less, favorable results can be obtained by using such pulse pattern analyzers 27 and 28 adapted to analyze pulse patterns in a duration of 5 successive pulses from the pulse generators 7 and 18 of a configuration as indicated by C and D below.

| C | D |
|---|---|
| 11111 | 00000 |
| 1111. | 00001 |
| 11100 | 00011 |
| 11000 | 00111 |
| 10000 | 01111 |

At these low pulse frequencies the pulse patterns 1 1 1 1 and 0 0 0 0 0 represent a maximum modulation index, but this also applies to the remaining pulse pattern configurations, namely the last-mentioned pulse configurations occur if the slope of the speech signal changes from a positive value to a negative value or conversely from a negative value to a positive value in a speech signal to be transmitted of a large or maximum modulation index within the duration of 5 successive pulses from the pulse generators 7 and 18.

A considerable simplification may be brought about in this device of the type shown in FIGS. 7 and 8 by using only one of the complementary pulse pattern configurations A and B and C and D, respectively, for the dynamic control, for example, if for the dynamic control in FIGS. 7 and 8 only the pulse pattern configurations as in A is employed, the AND gates 73, 75, 77, 79, 81 can be omitted. In this device use is made of the same property in the device according to the invention as already used for FIGS. 5 and 6 and it was illustrated with reference to FIGS. 4*d*, 4*i* and 4*n* that the number of pulses from the pulse pattern generators 27 and 28 as a result of the occurrence of pulse patterns of configuration A are equal at an average over a certain time unit to those as a result of the pulse patterns according to the complementary pulse pattern configurations D.

Figure 9:
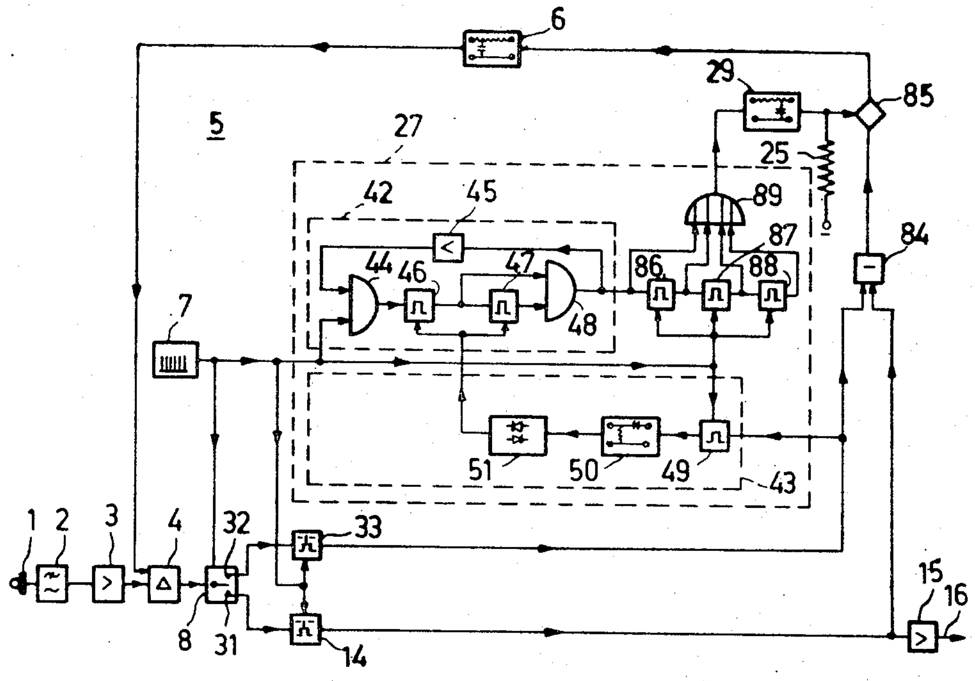
Figure 10:
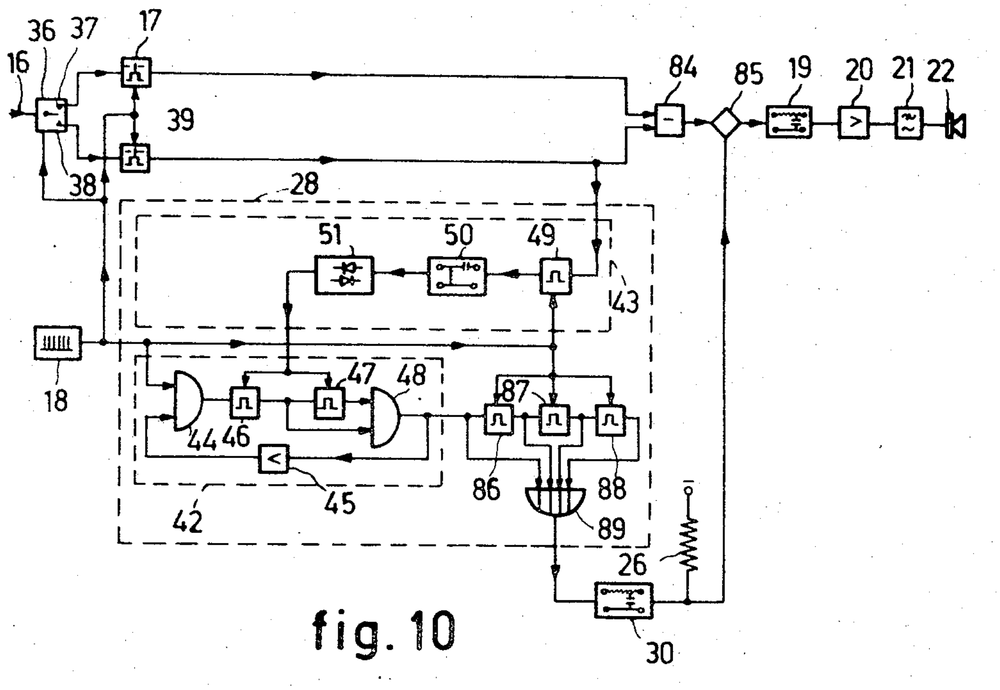

FIG. 9 and FIG. 10 show further embodiments of a transmitter and receiver according to the invention which may advantageously be used at low pulse frequencies.

As compared with the transmitter of FIG. 1 and FIG. 2, the transmitter and receiver of FIG. 9 and FIG. 10 differ in the construction of the control voltage balancing device and of the pulse pattern analyzers 27, 28. More particularly, in the transmitter and in the receiver of FIG. 9 and FIG. 10, for the suppression of the varying DC current component introduced by modulation in the circuit of the local receiver 5 and the cooperating receiver, the pulses originating from the complementary outputs 31, 32 and 37, 38 of the pulse code modulator 8 and of the switch 36 are applied after pulse regeneration in the pulse regenerators 14, 33 and 17, 39, respectively, directly to a difference producer 84 which is connected to an amplitude modulator 85 formed as a variable resistor. For example, for such an amplitude modulator 85 advantageous use can be made of a transistor of the MOST type. In fact, a series of pulses of positive and negative polarities occurs at the difference producer 84 and the amplitude of said pulses will vary with the dynamic control voltage is by modulation in the amplitude modulator 85. Exactly as in the previous embodiments the DC current component of the control voltage is suppressed in the series of positive and negative pulses at the output of the amplitude modulator 85 so that in the embodiments a maximum modulation range is also ensured while at low pulse frequencies the occurrence of whistling and interference tones is obviated.

As pulse pattern analyzers 27 and 28, use is made in these embodiments of the pulse pattern analyzers 27 and 28 already described in FIGS. 1 and 2 comprising the pulse counter 42 and the reset device 43, but in this device the pulse counter 42 is connected to the integrating networks 29, 30 through a shift register having three shift register elements 86–88 and a selection gate in the form of an OR gate connected to the ends of the shift register elements 86–88. As is illustrated in FIGS. 9 and 10, the contents of the shift register elements 86–88 are shifted by the pulse generators 7 and 18.

If in the devices described thus far four successive 1 pulses or 0 pulses occur at the output 32 of the pulse code modulator 8 and at the output 38 of the switch 36, then the pulse counter 42 will produce a pulse which on the one hand is applied through the OR gate 89 to the integrating networks 29 and 30 and other hand to the shift register 86–88 which shift registers 86–88 apply another three pulses through the OR gate 89 to the integrating networks 29,30 for the three subsequent pulses from the pulse generators 7 and 18. In addition to an output pulse of the pulse counter 42 the shift registers 86–88 thus apply three pulses having a duration equal to the time distance of the pulses from the pulse generators 7 and 18 to the integrating networks 29, 30 so that a comparative increase of the dynamic control voltage is obtained.

Particularly at low pulse frequencies, for example, 20 kHz this comparative increase of the dynamic control voltage is found to be of particular advantage which must be ascribed to the small number of pulses from the pulse generators 7 and 18 occurring per period of the high signal frequencies, in fact, due to the small number of pulses there is not sufficient time to build up the associated dynamic control voltage in the integrating networks 29, 30. It was found by experiment that in this device an improvement in the quality of transmission was indeed obtained at the said low pulse frequencies of 20 kHz which particularly became noticeable in signals to be transmitted of high frequency, for example, 3,000 Hz and large amplitude.

FIGS. 11 and 12 show further embodiments of a transmitter and receiver according to the invention, the integrating networks 29, 30 for generating the dynamic control voltage being built up in digital techniques while the pulse pattern analyzers 27, 28 used are adapted to the digital embodiment of the integrating networks 29, 30.

To this end, in this device, the pulse generators 7 and 18 are connected to a pulse counter 90 in the form of a ring counter which counts up to four and provided with two cascade-arranged bistable triggers 91,92 formed as 2 to 1 dividers and a selection gate formed by an AND gate 93 to whose input the input and output voltages of the bistable trigger 92 are applied, while the output pulses are derived from the output of the AND gate 93. Furthermore a reset device 94 connected to the pulse regenerators 31 and 39 is connected to the bistable triggers 91, 92 which reset device 43 of FIGS. 1 and 2, particularly the reset device 94 includes successively a bistable trigger 95 controlled by the pulse generators 7 and 18, a differentiating network 96 and a rectifier 97 which is connected to the bistable triggers 91, 92. Thus, in the absence of reset pulses of the reset device 94 the pulse counter 90 will provide a pulse every time at the fourth pulse from the pulse generators 7 and 18 through the OR gate 93, while the pulse counter 90 is returned to its initial position when a reset pulse of the reset device 94 occurs.

Furthermore, the device of FIG. 11 and FIG. 12 is provided with a second ring counter 98 connected to the pulse generator 7 which counter is built up in the same manner as the ring counter 90 already described but which counts up to a larger number of pulses, for example, 16 pulses, while reset pulses are applied to this ring counter 98 which are derived from the OR gate 93 of the pulse counter 90. In this pulse counter 98, an output pulse will be produced in the absence of reset pulses of the OR gate 93 every time after 16 pulses from the pulse generators 7 and 18, while as a result of a reset pulse of the OR gate 93 the pulse counter 98 is returned to its initial position.

The two pulse counters 90 and 98 control the integrating network designed in digital techniques in the form of a counter 99 formed as a binary counter having $n$ counting positions which counter forwards and backwards, for example, as described in Millman and Taub, Pulse, Digital and Switching Waveforms, Mc.Graw Hill, 1965, page 671, each counting unit being connected through suitably dimensioned resistors 100,101,102 to an output resistor 103, the dynamic control voltage for the amplitude modulator 85 being derived from the output resistor 103. The binary counter 99 is designed in such a manner that the final position and the initial position cannot be exceeded when counting forwards and backwards, respectively.

In this device the binary counter 99 will start to count in the forward direction due to the pulses of the OR gate 93, and backwards due to the pulses of the counter 98. For example, assuming that at a given instant the counting unit associated with the resistor 101 is active, a voltage functioning as a dynamic control voltage will be applied through this resistor 101 to the output resistor 103 of which the value of the ratio between the resistor 101 and the output resistor 103 is determined.

If the resistors 100, 101–102 connected to the counting units of the counter 99 in combination with the output resistor 103 are suitably dimensioned, then it is found that also in this device a particularly effective dynamic control can be obtained at a maximum modulation range.

In addition to the embodiments described hereinbefore of the device according to the invention, still further embodiments are possible, for example, pulse counters and reset devices of a different type may be utilized as pulse pattern analyzers 27 and 28. Characteristic of all these embodiments is always that the pulse pattern analyzers 27 and 28 analyze successively the configuration of the pulse patterns formed by the output pulses of the pulse code modulator 8 within a fixed and limited time interval of at least three successive pulses from the pulse generators 7 and 18 and that a pulse output voltage is provided when predetermined pulse patterns occur which correspond to a large modulation index within the said fixed time interval, which pulse output voltage is applied to the integrating networks 29, 30 for generating the dynamic control voltage. As described in the foregoing and explained with reference to time diagrams $4a$ – $4p$ a control voltage serving for dynamic control and exactly fully loading the device for delta modulation is obtained by the pulse pattern analyzers 27 and 28 and the subsequent integrating networks 29, 30 with the result that the S/N-ratio of signal and quantization noise is maintained at a maximum value. Together with this particularly effective dynamic control for continuously varying signals in which a maximum modulation range is simultaneously achieved this device is furthermore distinguished by wider possibilities of application, a favorable insensitivity to interference, no influence on the reproducibility by tolerances in the elements, while this device is particularly suitable for design in digital techniques and solid-state integration.

The dynamic control may alternatively be brought about in a different manner within the scope of the invention instead of by the amplitude modulators. For example, the signals to be transmitted at the transmitter end and the signals recovered at the receiver end may be applied to a dynamic control device in the form of a variable attentuation network, variable m$\mu$ valve or transistor controlled by the output voltage of the pulse pattern analyzers 27, 28 and subsequent integrating networks 29, 30. An advantage for these types of embodiment is to design the dynamic control device in the digital technique particularly in the manner as illustrated in FIG. 13.

FIG. 13 shows a further embodiment of a transmitter according to the invention in which elements corresponding to those of FIG. 1 are denoted by the same reference numerals.

In the manner as already described hereinbefore, this device is provided with a pulse pattern analyzer 27 and a subsequent integrating network 29 connected to the output of the pulse code modulator 8 for generating the dynamic control voltage for the purpose of dynamic control in dynamic control device of the signals to be transmitted. For this purpose, use is made in the embodiment shown of a pulse duration modulator 104 which is controlled by the signals to be transmitted and by the dynamic control voltage succeeded by a pulse duration demodulator 105 from whose output the dynamic controlled signals are derived which for further handling in the delta modulation transmitter are applied to the difference producer 4.

To this end, the pulse generator 7 in this device is connected to an amplitude modulator 106 to which the output voltage of the integrating network 29 and a reference voltage are applied in the manner as already described hereinbefore, and an attenuated circuit 107 is provided at the output of the amplitude modulator 106 which circuit is tuned to a considerably lower frequency than the frequency of pulses from the pulse generator 7. Pulses varying with the control voltage of the integrating network are produced at the output of the amplitude modulator 106 and a sawtooth voltage varying with this control voltage is produced by integration in the attenuated circuit 107 which sawtooth voltage is applied to a fullwave limiter 108 together with the signals to be transmitted for generating duration modulated pulses. After demodulation in a pulse duration demodulator 105, for example, formed by a lowpass filter 109 having a cut-off frequency of 4 kc/s and a subsequent sampler 110 controlled by the pulse generator seven pulses varying in amplitude with the dynamic controlled signals are obtained which for further handling in the transmitter for delta modulation are applied to the difference producer 4.

For recovering the signals to be transmitted a receiver of the type shown in FIGS. 2, 6, 8, 10 and 12 may be used, in which the pulse pattern analyzer 28 must be formed in the same manner as the pulse pattern analyzer 27 of the transmission device shown in FIG. 13.

In this connection, it is to be noted that in the transmitter of FIG. 13 it is not necessary to use a control voltage balancing device since no varying DC current component is introduced therein due to modulation in the local receiver 5 of the transmitter for delta modulation. Likewise it is not necessary to use a control voltage balancing device in the cooperating receiver in case of speech transmission.

Furthermore, it is to be noted that the control voltage balancing device may alternatively be formed in a different manner. For example, pulses of different polarities may directly be derived from the outputs 31, 32 and 37, 38 of the pulse code modulator 8 having a change-of-state contact and the switch 36, respectively, so that for suppression of the varying DC current component these pulses must be applied to an adder in this case. Both in this modification and in the embodiments shown in the Figures it must, however, always be possible for the pulses at the outputs 31, 32 and 37, 38 of the pulse code modulator 8 and the switch 36 to be combined in a combination device. The two pulse series at the outputs 37, 38 may alternatively be transmitted simultaneously in which case the switch 36 having a change-of-state contact may be omitted at the receiver end.

Instead of the use of a pulse amplitude modulator for dynamic control, a pulse duration modulator or a combination of both may alternatively be used.

What is claimed is:

1. A transmitter system comprising a pulse code modulator for producing an output pulse signal, a pulse generator, means to couple said pulse generator to said pulse code modulator, a pulse pattern analyzer, means to couple the output signal of said pulse code modulator to said pulse pattern analyzer, said pulse pattern analyzer successively analyzing the instantaneous modulation index of pulse patterns in said output signal of said pulse code modulator over a time interval of at least 3 successive pulses from said pulse generator and producing an output signal only upon the occurence of pulse patterns with an instantaneous modulation index exceeding a predetermined value of at least half the maximum instantaneous modulation index within said time interval, a first integrating network coupled to the output signal of said pulse pattern analyzer for providing a control signal, control means for varying the energy content of said output signal of said pulse code modulator directly as a function of said control signal, means to couple said output signal of said pulse code modulator and said control signal to said control means, a comparison system having two input means and an output means, the comparison system comprising a second integrating network and a difference producer, means to couple the output of said control means to one of said comparison system input means, means to couple said comparison system output means to said pulse code modulator, means to couple an input signal to said transmitter to the other of said comparison system input means, and means for deriving said output signal from said pulse code modulator as an output signal of said transmitter system.

2. A transmitter system as claimed in claim 1 wherein said control means comprises means to suppress a varying direct current component from said pulse pattern analyzer.

3. A transmitter system as claimed in claim 1, wherein said pulse code modulator outputs a second signal having complementary pulses to said first output signal from said pulse code modulator.

4. A transmitter system as claimed in claim 3, wherein said control means comprises two modulators coupled to said first and said second output signals from said pulse code modulator pulse respectively and a second difference producer is coupled to respective outputs of said two modulators, said pulse pattern analyzer output signal being a pulse, said two modulators being responsive to said pulse pattern analyzer pulse signal.

5. A transmitter system as claimed in claim 1 wherein said pulse pattern analyzer comprises means for counting pulses.

6. A transmitter system as claimed in claim 1, wherein said pulse pattern analyzer is coupled to said pulse generator.

7. A transmitter system as claimed in claim 1, wherein said pulse pattern analyzer further comprises a second pulse generator having output pulses to constant duration and amplitude and being responsive to pulses from said first pulse generator.

8. A transmitter system as claimed in claim 1, wherein said means to couple said first integrating network to said control means comprises an amplifier having an exponential amplification characteristics.

9. A transmitter system as claimed in claim 1, wherein said control means comprises at least one modulator.

10. A transmitter system as claimed in claim 1, wherein said pulse pattern analyzer comprises a pulse counter.

11. A transmitter system as claimed in claim 10, wherein said pulse counter comprises a first AND gate having input and output means coupled to said pulse generator, a second AND gate having input and output means to provide gating of output pulse signals from said pulse counter, an inverter connected from one of the output means to said second AND gate to one of the input means of said first AND gate, and two bistable triggers interconnected to operate as a two-to-one divider coupled between one of the output means of said first AND gate and one of the input means of said second AND gate.

12. A transmitter system as claimed in claim 10, wherein said pulse counter comprises a capacitor having a charging voltage, a constant supply voltage for charging said capacitor, a constant reference voltage, and means to compare said charging voltage with said constant reference voltage.

13. A transmitter system as claimed in claim 10, wherein said pulse pattern analyzer further comprises a reset device coupled to said output signal of said switch device, said reset device supplying reset signals for said pulse counter.

14. A transmitter system as claimed in claim 13, wherein said reset device comprises a bistable element coupled to said switch device, a differentiator coupled to said bistable element, and a full wave rectifier coupled between said differentiator and said pulse counter.

15. A transmitter system as claimed in claim 13, wherein said reset device comprises a normally off transistor controlled by said switch device.

16. A transmitter system as claimed in claim 1, wherein said pulse pattern analyzer comprises a shift register having a plurality of serially coupled shift register elements, means to couple said output pulses from said switch device to said shift register, a plurality of AND gates each having a plurality of input means and an output means coupled to selected shift register elements, and an OR gate coupled to said AND gate output means, said OR gate providing a pulse signal for selected states of said shift register elements, said OR gate output signal being the output signal of said pulse pattern analyzer.

17. A transmitter system as claimed in claim 16, wherein said shift register elements each have complementary output signals and said complementary output signals are coupled to a second plurality of AND gates.

18. A transmitter system as claimed in claim 1, further comprising a shift register having at least one shift register element, said shift register coupled to said pulse pattern analyzer and to said pulse generator, and an OR gate having a plurality of input means and an output means, said OR gate input means coupled to said shift register elements and said OR gate output means coupled to said first integrating network.

19. A transmitter system as claimed in claim 13, wherein said pulse counter comprises a first ring counter having an output means and said pulse pattern analyzer further comprises a second ring counter having an input means coupled to said pulse generator, an input means of said reset device coupled to said first counter output means, said first integrating network comprising a forward backward counter having forward and backward inputs coupled to said outputs of said first and said second ring counters respectively, and a resistor network coupling said forward-backward counter to said first integrating network.

20. A transmitter system as claimed in claim 1, wherein said pulse code modulator provides a second output pulse series having a complementary relationship with the pulses of the first output signal from said pulse code modulator, said control means having input means coupled to receive said first and second output signals from said pulse code modulator, and control input means coupled to receive said control signal from said first integrating network, comprising modulating means and combining means coupled with said modulating means for producing modulated output pulses of a first polarity in response to said first output signal from said pulse code modulator and for producing modulated output pulses of a polarity opposite to that of said first polarity in response to said second output signal from said pulse code modulator, whereby the energy content of the modulated output pulses of said control means increasing control signal from said first integrating network.

21. A transmitter system as claimed in claim 1, wherein said pulse pattern analyzer comprises a scale of *n* pulse counter producing an output pulse signal, where N is an integer greater than two, an and-gate coupled between said pulse generator and said pulse counter, means to couple said output signal from said pulse counter as an inhibit signal to said and-gate, and means to couple pulses of one type in said output signal from said pulse code modulator as reset pulses to said pulse counter, whereby said pulse counter produces an output pulse signal only upon the occurrence of *n* successive pulses of the other type in said output signal from said pulse code modulator, said pulse counter output signal being the output signal of said pulse pattern analyzer.

22. A transmitter system as claimed in claim 1, wherein said pulse pattern analyzer comprises a scale of *n* pulse counter producing an output pulse signal, where *n* is an integer greater than two, an and-gate coupled between said pulse generator and said pulse, counter, means to couple said output signal from said pulse counter as an inhibit signal to said and-gate, and reset means coupled to said pulse code modulator for producing a reset pulse for said pulse counter in response to the occurrence of a pulse reversal in said output signal from said pulse code modulator, whereby said pulse counter produces an output pulse signal only upon the occurrence of *n* successive equal pulses in said output signal from said pulse code modulator, said pulse counter output signal being the output signal of said pulse pattern analyzer.

23. A transmitter system as claimed in claim 22, wherein said reset means comprises a bistable element coupled to said pulse code modulator, a differentiating network coupled to said bistable element, and a full wave rectifier coupled between said differentiating network and said pulse counter.

24. A transmitter system as claimed in claim 1, wherein said pulse pattern analyzer comprises a capacitor having a charging voltage, a source of constant supply voltage for charging said capacitor, discharge means coupled to said capacitor being responsive to reset pulses, a source of constant reference voltage at least equal to said charging voltage at the end of a time interval of $n$ successive pulses of said pulse generator, where $n$ is an integer greater than unity, comparison means coupled to receive said charging voltage and said constant reference voltage for producing an output signal when said charging voltage exceeds said constant reference voltage, pulse regenerator means having output pulses of constant amplitude and being responsive to the output signal of said comparison means, and means to couple pulses of one type in said putput signal from said pulse code modulator as reset pulses to said discharge means, whereby said pulse regenerator means produces an output pulse signal only upon the occurrence of $(n+1)$ successive pulses of the other type in said output signal from said pulse code modulator; said pulse regenerator output signal being the output signal of said pulse pattern analyzer.

25. A transmitter system as claimed in claim 1, wherein said pulse pattern analyzer comprises a capacitor having a charging voltage, a source of constant supply voltage for charging said capacitor, discharge means coupled to said capacitor being responsive to reset pulses, a source of constant reference voltage at least equal to said charging voltage at the end of a time interval of $n$ successive pulses of said pulse generator, where $n$ is an integer greater than unity, comparison means coupled to receive said charging voltage and said constant reference voltage for producing an output signal when said charging voltage exceeds said constant reference, voltage, pulse regenerator means having output pulses of constant amplitude and being responsive to the output signal of said comparison means, and reset means coupled to said pulse code modulator for producing a reset pulse for said discharge means in response to the occurrence of a pulse reversal in said output signal from said pulse code modulator, whereby said pulse regenerator means produces an output pulse signal only upon the occurrence of $(n+1)$ successive equal pulses in said output signal from said pulse code modulator, said pulse regenerator output signal being the output signal of said pulse pattern analyzer.

26. A transmitter system as claimed in claim 25, wherein said reset means comprises a bistable element coupled to said pulse code modulator, a differentiating network coupled to said bistable element, and a full wave rectifier coupled between said differentiating network and said discharge means.

27. A transmitter system as claimed in claim 1, wherein said pulse pattern analyzer comprises a shift register having a shift input coupled to said pulse generator and at least three serially coupled shift register elements, means to couple said output signal from said pulse code modulator to said shift register, at least one and-gate having at least three input means and an output means coupled to said shift register elements, and output coupling means to couple said and-gate output means to said first integrating network.

28. A transmitter system as claimed in claim 27, wherein said shift register element each have complementary outputs, said pulse pattern analyzer further comprising at least a second and-gate having at least three input means and an output means coupled to said complementary outputs, said output coupling means comprising an or-gate coupled to said first and second and-gate output means, said or-gate providing a pulse signal for selected states of said shift register elements, said or-gate output signal being the output signal of said pulse pattern analyzer.

29. A transmitter system as claimed in claim 1, further comprising a shift register having at least one shift register element, said shift register being coupled to said pulse pattern analyzer and said pulse generator, and an or-gate having at least two input means and an output means coupled to said shift register elements, said or-gate output means being coupled to said first integrating network.

30. A receiver system comprising a switch device for producing an output pulse signal, means to couple an input signal to said receiver system to said switch device, a pulse generator synchronized to said input signal to said receiver system, means to couple said pulse generator to said switch device, a pulse pattern analyzer, means to couple said switch device to said pulse pattern analyzer, said pulse pattern analyzer successively analyzing the instantaneous modulation index of pulse patterns in said output signal of said switch device over a time interval of at least three successive pulses from said pulse generator and producing an output signal only upon the occurence of pulse patterns with an instantaneous modulation index exceeding a predetermined value of at least half the maximum instantaneous modulation index within said time interval, an integrating network coupled to the output signal of the pulse pattern analyzer for providing a control signal, control means for varying the energy content of said output signal of said switch device directly as a function of said control signal, means to couple said output signal of said switch device and said control signal and said control means, a smoothing network, means to couple the output of said control means to said smoothing network, and means for deriving an output signal from said smoothing network as an output from said receiver system.

31. A receiver system as claimed in claim 30, wherein said second integrating network comprises a low pass filter having a cut-off frequency in the order of low frequencies of the modulation index variations.

32. A receiver system as claimed in claim 31, wherein said second integrating network further comprises a second low pass filter having a cut-off frequency greater than said cut-off frequency of said first low pass filter.

33. A receiver system as claimed in claim 30, wherein said pulse pattern analyzer further comprises a second pulse generator having an output pulse signal of constant duration and amplitude and being responsive to pulse signals from said first pulse generator.

34. A receiver system as claimed in claim 30, wherein said means to couple said first integrating network to said feedback means comprises an amplifier having an exponential amplification characteristics.

35. A receiver system as claimed in claim 30, wherein said feedback means comprises means to suppress a varying direct current fro said pulse pattern analyzer.

36. A receiver system as claimed in claim 1, wherein said switch device outputs a second signal having complementary pulses to said first output signal from said switch device.

37. A receiver system as claimed in claim 30, wherein said feedback means comprises at least one modulator.

38. A receiver system as claimed in claim 36, wherein said feedback means comprises two modulators coupled to said first and said second output signals from said switch device respectively and a difference producer is coupled to output means of the two modulators, said pulse pattern analyzer output signal being a pulse, said two modulators being responsive to said pulse pattern analyzer pulse signal.

39. A receiver system as claimed in claim 1, wherein said pulse pattern analyzer comprises a pulse counter.

40. A receiver system as claimed in claim 39, wherein said pulse counter comprises a first AND gate having an input and output coupled to said pulse generator, a second AND gate having input and output means to provide an output pulse signal from said pulse counter, an inverter connected from the output means of said second AND gate to the input means of said first AND gate, and two bistable triggers interconnected to operate as a two-to-one divider coupled between the output means of said first AND gate and the input means of said second AND gate.

41. A receiver system as claimed in claim 39, wherein said pulse counter comprises a capacitor having a charging voltage, a constant supply voltage for charging said capacitor, a constant reference voltage, and means to compare said charging voltage with said constant reference voltage.

42. A receiver system as claimed in claim 39, wherein said pulse pattern analyzer further comprises a reset device coupled to said first output signal from said switch device, said reset device supplying reset pulses for said pulse counter.

43. A receiver system as claimed in claim 42, wherein said reset device comprises a bistable element coupled to said switch device, a differentiator coupled to said bistable element, and a full wave rectifier coupled between said differentiator and said pulse counter.

44. A receiver system as claimed in claim 42, wherein said reset device comprises a normally off transistor controlled by said switch device.

45. A receiver system as claimed in claim 30, wherein said pulse pattern analyzer comprises a shift register having a plurality of serially coupled shift register elements, means to couple said output pulses from said switch device to said shift register, a plurality of AND gates each having a plurality of input means and an output means coupled to selected shift register elements, and a OR gate coupled to said AND gate output means, said OR gate providing an output pulse signal for selected states of said shift register elements, said OR gate output signal being the output signal of said pulse pattern analyzer.

46. A receiver as claimed in claim 45, wherein said shift register elements each have complementary output signals and said complementary output signals are coupled to a second plurality of AND gates.

47. A receiver as claimed in claim 30, further comprising a shift register having at least one shift register element, said shift register coupled to said pulse pattern analyzer and to said pulse generator, and an OR gate having a plurality of input means and an output means coupled to said first integrating network.

48. A receiver as claimed in claim 42, wherein said pulse counter comprises a first ring counter having an output means and said pulse pattern analyzer further comprises a second ring counter having an input means coupled to said pulse generator, an input means of said reset device coupled to said pulse generator, an input means of said reset device coupled to said first counter output means, said first integrating network comprising a forward-backward counter having forward and backward input means coupled to said output means of said first and said second ring counters respectively, and a resistor network coupling said forward-backward counter to said first integrating network.

49. A transmitter system as claimed in claim 1, wherein said pulse pattern analyzer comprises a first ring counter having an output means coupled to said pulse generator, reset means coupled to said pulse code modulator for producing reset pulse for said first ring counter, a second ring counter having an output means coupled to said pulse generator, and means coupled to said output of said first ring counter for producing reset pulses for said second ring counter, said first integrating network comprising a forward-backward counter having forward and backward inputs coupled to said outputs of said first and said second ring counters respectively, and a resistor network coupling said forward-backward counter to said control means.

50. A transmitter system as claimed in claim 1, wherein said means coupling said first integrating network to said control means comprises a source of constant reference signal, and combination means for combining said control signal and said constant reference signal for controlling the energy content of said output signal of said pulse code modulator in the absence of said control signal.

51. A receiver system as claimed in claim 30, wherein said switch device outputs a second pulse signal having complementary pulses to said first output signal from said switch device, said control means having input means coupled to receive said first and second output signals from said switch device and control input means coupled to receive said control signal from said integrating network, comprising modulating means and combining means coupled with said modulating means, for producing modulated output pulses of one polarity in response to said first output signal from said switch device and of the other polarity in response to said second output signal from said switch device so that the energy content of the modulated output pulses of said control means increases with increasing control signal from said integrating network.

52. A receiver system as claimed in claim 30, wherein said pulse pattern analyzer comprises a scale of $n$ pulse counter producing an output pulse signal, where $n$ is an integer greater than two, and and-gate coupled between said pulse generator and said pulse counter, means to couple said output signal from said pulse counter as an inhibit signal to said and-gate, and means to couple pulses of one type in said output signal from said switch device as reset pulses to said pulse counter, whereby said pulse counter produces an output pulse signal only upon the occurrence of $n$ successive pulses of the other type in said output signal from said switch device, said pulse counter output signal being the output signal of said pulse pattern analyzer.

53. A receiver system as claimed in claim 30, wherein said pulse pattern analyzer comprises a scale of $n$ pulse counter producting an output signal, where $n$ is an integer greater than two, an and-gate coupled between said pulse generator and said pulse counter, means to couple said output signal from said pulse counter as an inhibit signal to said and-gate, and reset means coupled to said switch device for producing a reset pulse for said pulse counter in response to the occurrence of a pulse reversal in said output signal from said switch device, whereby said pulse counter produces an output pulse signal only upon the occurrence of $n$ successive equal pulses in said output signal from said swithc device, said pulse counter output signal being the output signal of said pulse pattern analyzer.

54. A receiver system as claimed in claim 53, wherein said reset means comprises a bistable element coupled to said switch device, a differentiating network coupled to said bistable element, and a full wave rectifier coupled between said differentiating network and said pulse counter.

55. A receiver system as claimed in claim 30, wherein said pulse pattern analyzer comprises a capacitor having a charging voltage, a source of constant supply voltage for charging said capacitor, discharge means coupled to said capacitor being responsive to reset pulses, a source of constant reference voltage at least equal to said charging voltage at the end of a time interval of $n$ successive pulses of said pulse generator, where $n$ is an integer greater than unity, comparison means coupled to receive said charging voltage and said constant reference voltage for producing an output signal when said charging voltage exceeds said constant reference voltage, pulse regenerator means having output pulses of constant amplitude and being responsive to the output signal of said comparison means, and means to couple pulses of one type in said output signal from said switch device as reset pulses to said discharge means, whereby said pulse regenerator means produces an output pulse signal only upon the occurrence of $(n+1)$ successive pulses of the other type in said output signal from said swithc device; said pulse regenerator output signal being the output signal of said pulse pattern analyzer.

56. A receiver system as claimed in claim 30, wherein said pulse pattern analyzer comprises a capacitor having a charging voltage, a source of constant supply voltage for charging said capacitor, discharge means coupled to said capacitor being responsive to reset pulses, a source of constant reference voltage at least equal to said changing voltage at the end of a time interval of $n$ successive pulses of said pulse generator, where $n$ is an integer greater than unity, comparison means coupled to receive said charging voltage and said constant reference voltage for producing an output signal when said charging voltage exceeds said constant reference voltage, pulse regenerator means having output pulses of constant amplityde and being responsive to the output signal of said comparison means, and reset means coupled to said switch device for producing a reset pulse for said discharge means in response to the occurrence of a pulse reversal in said output signal from said pulse code modulator, whereby said pulse regenerator means produces an output pulse signal only upon the occurrence of $(n+1)$ successive equal pulses in said output signal from said switch device, said pulse regenerator output signal being the output signal of said pulse pattern analyzer.

57. A receiver system as claimed in claim 56, wherein said reset means comprises a bistable element coupled to said switch device, a differentiating network coupled to said bistable element, and a full wave rectifier coupled between said differentiating network and said discharge means.

58. A receiver system as claimed in claim 30, wherein said pulse pattern analyzer comprises a shift register having a shift input coupled to said pulse generator and at least three serially coupled shift register elements, means to couple said output signal from said switch device to said shift register, at least one and-gate having at least three input means and an output means coupled to said shift register elements, and output coupling means to couple said and-gate output means to said integrating network.

59. A receiver system as claimed in claim 58, wherein said shift register elements each have complementary outputs, said pulse pattern analyzer further comprising at least a second and-gate having at least three input means and an output means coupled to said complementary outputs, said output coupling means comprising an or-gate coupled to said first and second and-gate output means, said or-gate providing a pulse signal for selected states of said shift register elements, said or-gate output signal being the output signal of said pulse pattern analyzer.

60. A receiver system as claimed in claim 30, further comprising a shift register having at least one shift register element, said shift register being coupled to said pulse pattern analyzer and said pulse generator, and an or-gate having at least two input means and an output means coupled to said chift register element, said or-gate output means being coupled to said integrating network.

61. A receiver system as claimed in claim 30, wherein said pulse pattern analyzer comprises a first ring counter having an output means coupled to said pulse generator, reset means coupled to said switch device for producing reset pulses for said first ring counter, a second ring counter having an output means coupled to said pulse generator, and means coupled to said output of said first ring counter for producing reset pulses for said second ring counter, said integrating network comprising a forward-backward counter having forward and backward inputs coupled to said outputs of said first and said second ring counter respectively, and a resistor network coupling said forward-backward counter to have control means.

62. A receiver system as claimed in claim 30, wherein said means coupling said integrating network to said control means comprises a source of constant reference signal, and combination means for combining said control signal and said constant reference signal for controlling the energy content of said output signal of said switch device in the absence of said control signal.

* * * * *

65